United States Patent
Yokoi et al.

(10) Patent No.: US 7,757,071 B2
(45) Date of Patent: Jul. 13, 2010

(54) BRANCH PREDICTING APPARATUS AND BRANCH PREDICTING METHOD

(75) Inventors: Megumi Yokoi, Kawasaki (JP); Masaki Ukai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/995,158

(22) Filed: Nov. 24, 2004

(65) Prior Publication Data

US 2006/0026410 A1    Feb. 2, 2006

(30) Foreign Application Priority Data

Jul. 29, 2004    (JP) ............................. 2004-222399

(51) Int. Cl.
G06F 9/00    (2006.01)
(52) U.S. Cl. ...................... 712/239; 712/238
(58) Field of Classification Search .................. 712/238, 712/239

See application file for complete search history.

(56) References Cited

U.S. PATENT DOCUMENTS

| | | | |
|---|---|---|---|
| 4,636,943 A | | 1/1987 | Horst et al. |
| 5,179,673 A | | 1/1993 | Steely, Jr. et al. |
| 5,454,087 A | | 9/1995 | Narita et al. |
| 5,564,118 A | | 10/1996 | Steely et al. |
| 5,604,877 A | * | 2/1997 | Hoyt et al. ................... 712/243 |
| 5,964,868 A | | 10/1999 | Gochman et al. |
| 5,974,543 A | | 10/1999 | Hilgendorf et al. |
| 6,374,350 B1 | * | 4/2002 | D'Sa et al. .................. 712/239 |
| 6,530,016 B1 | | 3/2003 | Ukai et al. |
| 7,350,062 B2 | | 3/2008 | Ukai et al. |
| 2002/0129226 A1 | | 9/2002 | Eisen et al. |
| 2003/0097549 A1 | | 5/2003 | Ukai et al. |
| 2005/0076193 A1 | * | 4/2005 | Henry et al. ................. 712/238 |

FOREIGN PATENT DOCUMENTS

| | | |
|---|---|---|
| JP | 5-120013 A | 5/1993 |
| JP | 6-161748 A | 6/1994 |
| JP | 11-259298 A | 9/1999 |
| JP | 2000-172507 | 6/2000 |
| JP | 2001-172507 A | 6/2001 |

OTHER PUBLICATIONS

Office Action mailed on May 27, 2008 and issued in corresponding Japanese Patent Application No. 2004-222399.
Japanese Office Action for corresponding Japanese Application No. 2004-222399 mailed Oct. 28, 2008.
European Search Report dated Jan. 14, 2008 in corresponding European Patent Application No. 04257390.7-1243.
J. Losq, "Subroutine Return Address Stack" IBM Technical Disclosure Bulletin, IBM Corp. New York, US, vol. 24, No. 7A, Dec. 1981 (1981.12), pp. 3255-3258, XP000619537.

* cited by examiner

Primary Examiner—Alford W Kindred
Assistant Examiner—Benjamin P Geib
(74) Attorney, Agent, or Firm—Staas & Halsey LLP

(57) ABSTRACT

A return address in response to a return instruction corresponding to a call instruction is stored in a return address stack when a branch history detects presence of the call instruction. When the branch history detects the presence of the return instruction before a branch reservation station completes executing the call instruction, the return address in response to the return instruction is not stored in the return address stack. If so, an output selection circuit predicts a correct return target using information stored in the return address stack.

9 Claims, 21 Drawing Sheets

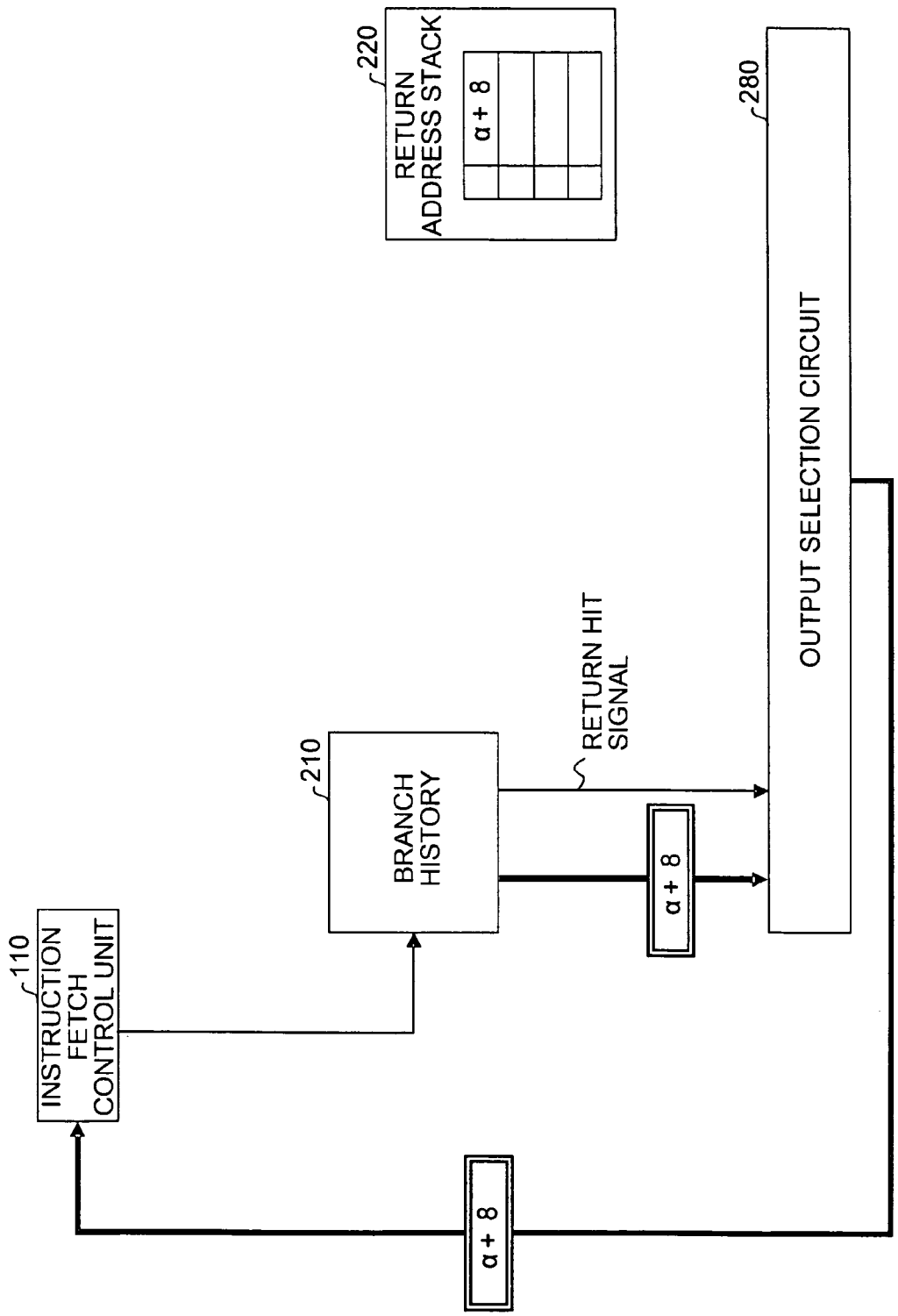

BRANCH PREDICTING APPARATUS AND BRANCH PREDICTING METHOD

BACKGROUND OF THE INVENTION

1. Field of the Invention

The present invention relates to a branch predicting apparatus and a branch predicting method for predicting a branch in a pipeline processor, and more particularly, to a branch predicting apparatus and a branch predicting method capable of improving accuracy for predicting a branch target of a return instruction.

2. Description of the Related Art

Conventionally, a branch predicting method is widely used to accelerate a processing for a pipeline processor. When a branch is present in a program, it is originally necessary to stop a pipeline until the branch is confirmed. The processor that performs a branch prediction, however, predicts the branch and speculatively executes an instruction after the branch prediction.

The branch prediction carries a major advantage that a processing time until the branch is confirmed can be shortened. The branch prediction has, however, a major disadvantage that, when the prediction is missed, it is necessary to flash the pipeline and re-starts the processing at the branch instruction. Prediction accuracy is, therefore, quite important for the branch prediction.

A branch history is normally used for the branch prediction. The branch history is an apparatus that stores, as a history, a pair of an address of a previously executed branch instruction and an address of a branch target branched in response to the branch instruction. Since the branch prediction using the branch history is based on the history, it is effective when the same branch is repeated as in a loop processing. However, it is less effective for a return instruction from a sub-routine.

When a branch is produced in response to the return instruction from the sub-routine, the branch target is an instruction next to a call instruction in the sub-routine. Normally, however, the sub-routine is called from every location of the program, so that a return target of the return instruction is not fixed. As a result, even when the branch target is predicted according to the history, the prediction is not always correct.

Considering this, Japanese Patent Application Laid-open Publication No. 2001-172507 discloses a technique for storing a return address of a return instruction is stored in a return address stack when a call instruction from a sub-routine is executed, and making a prediction while giving a high priority on the return address stack over a branch history for the return instruction.

According to the technique disclosed in the above literature, the return address of the return instruction that corresponds to a call instruction is stored in the return address stack after execution of the call instruction is completed. Due to this, when the branch history detects the return instruction by an advance reading of an instruction sequence or the like before the execution of the call instruction is completed, the return address is not stored in the returns address stack.

If so, a previous return target stored in the branch history is predicted as the present return target. However, as already explained, the accuracy for the prediction based on the branch history is not high for the return instruction. Thus, the technique disclosed in the above literature has the problem that the branch prediction accuracy is deteriorated depending on a return-instruction detection timing.

SUMMARY OF THE INVENTION

It is an object of the present invention to solve at least the above problems in the conventional technology.

A branch predicting apparatus according to one aspect of the present invention, which makes a branch prediction in a pipeline processor, includes a branch predicting unit that stores execution history information on a branch instruction that includes a call instruction and a return instruction, and that performs the branch prediction based on the execution history information; a first return-address storage unit that stores, when the branch predicting unit predicts presence of the call instruction in a sub-routine, a return address in response to the return instruction that corresponds to the call instruction in a first-in last-out manner; a second return-address storage unit that stores, when the call instruction in the sub-routine is executed, a return address in response to the return instruction that corresponds to the call instruction in the sub-routine in the first-in last-out manner; and an output selecting unit that selects an appropriate result of the branch prediction from among information stored in the branch predicting unit, information stored in the first return-address storage unit, and information stored in the second return-address storage unit, and that outputs the result of the branch prediction selected.

A branch predicting apparatus according to another aspect of the present invention, which makes a branch prediction in a pipeline processor, includes a branch predicting unit that stores execution history information on a branch instruction that includes a call instruction and a return instruction, and that performs the branch prediction based on the execution history information; a return-address storage unit that stores, when the branch predicting unit predicts presence of the call instruction in a sub-routine, a return address in response to the return instruction that corresponds to the call instruction in a first-in last-out manner; and an output selecting unit that selects an appropriate result of the branch prediction from among information stored in the branch predicting unit, information stored in the return-address storage unit, and that outputs the result of the branch prediction selected.

A branch predicting method according to still another aspect of the present invention, which is for making a branch prediction in a pipeline processor, includes a branch predicting step of storing execution history information on a branch instruction that includes a call instruction and a return instruction, and performing the branch prediction based on the execution history information; a first return-address storing step of storing, when presence of the call instruction in a sub-routine is predicted at the branch predicting step, a return address in response to the return instruction that corresponds to the call instruction in a first-in last-out manner; a second return-address step of storing, when the call instruction in the sub-routine is executed, a return address in response to the return instruction that corresponds to the call instruction in the sub-routine in the first-in last-out manner; and an output selecting step of selecting an appropriate result of the branch prediction from among information stored at the branch predicting step, information stored at the first return-address storing step, and information stored in the second return-address storing step, and that outputting the result of the branch prediction selected.

A branch predicting method according to still another aspect of the present invention, which is for making a branch prediction in a pipeline processor, includes a branch predicting step of storing execution history information on a branch instruction that includes a call instruction and a return instruction, and performing the branch prediction based on the execution history information; a return-address storing step of storing, when presence of the call instruction in a sub-routine is predicted at the branch predicting step, a return address in response to the return instruction that corresponds to the call instruction in a first-in last-out manner; and an output selecting step of selecting an appropriate result of the branch prediction from among information stored at the branch predicting step, information stored in the return-address storing step, and that outputting the result of the branch prediction selected.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 22 is an explanatory view for a case in which a branch prediction is missed when the second return instruction is detected by the conventional branch predicting method.

DETAILED DESCRIPTION

Exemplary embodiments of a branch predicting apparatus and a branch predicting method according to the present invention will be explained in detail with reference to the accompanying drawings.

Figure 1:
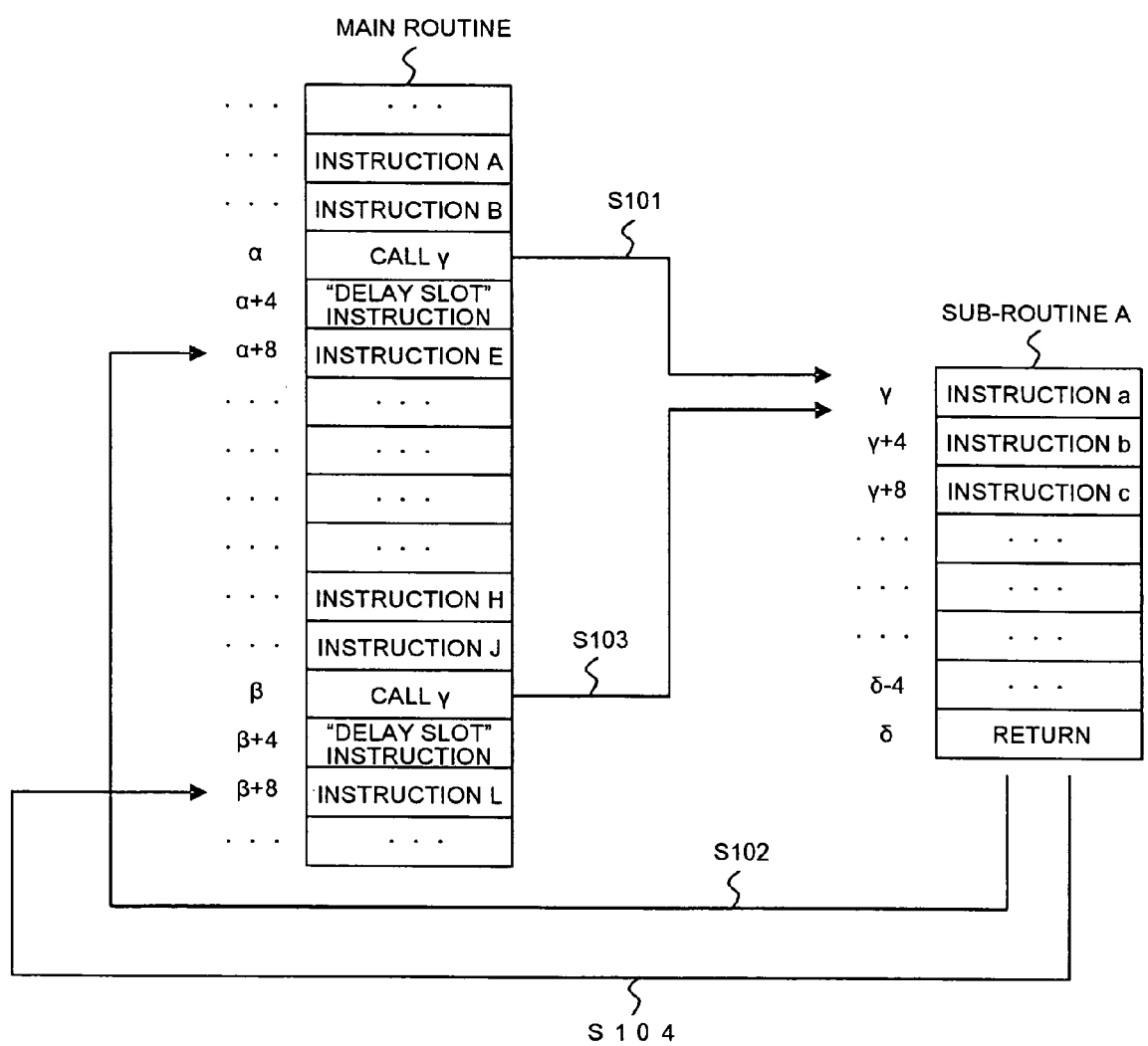
FIG. 1 is an explanatory view for a program used to explain the principle of a branch predicting method according to one embodiment.

FIG. 1 is an explanatory view for a program used to explain a principle of a branch predicting method according to a first embodiment of the present invention.

As shown in FIG. 1, this program executes a call instruction for calling a sub-routine A, at an address $\alpha$ (at a step S101). The sub-routine A ends in response to a return instruction at an address $\delta$, and the program returns to an address $\alpha+8$ in a main routine to continue a processing (at a step S102).

The reason that the return address is $\alpha+8$ is that an instruction length of a processor that executes this program is four bytes and that an instruction in the delay slot always follows a branch instruction. When a type of the processor differs from that used in the present embodiment, an increment of the address often differs from +8.

The program executes a call instruction for calling again the sub-routine A, at an address $\beta$ (at a step S103). The sub-routine A ends in response to the return instruction at the address $\delta$, and the program returns to an address $\beta+8$ in the main routine this time to continue the processing (at a step S104).

As can be seen, the branch target in response to the return instruction changes according to a calling source of the sub-routine. As a result, accuracy for predicting the branch target in response to the return instruction based on a branch history, which is a previous branch history, becomes low.

Figure 20:
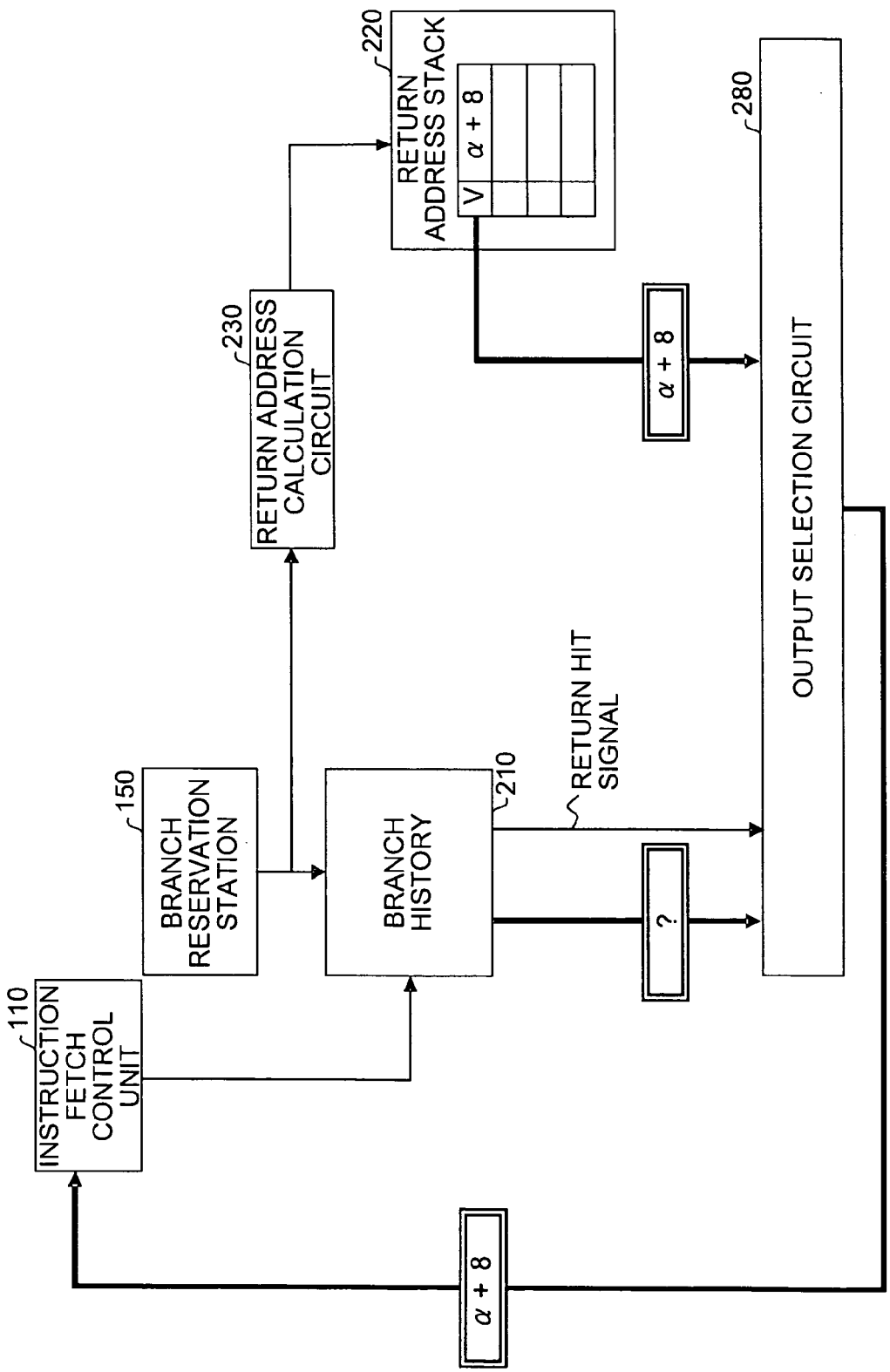
FIG. 20 is an explanatory view for a branch prediction when a first return instruction is detected by a conventional branch predicting method.

FIG. 20 is an explanatory view for a branch prediction when the first return instruction is detected in the conventional branch predicting method. As shown in FIG. 20, according to the conventional technique disclosed in the Patent Literature 1, a return address stack 220 is employed so as to improve the accuracy for predicting the return target of the return instruction.

According to this conventional branch predicting method, when a call instruction is executed at a branch reservation station 150, an address obtained by incrementing an address of the call instruction by +8 is stored in the return address stack 220 as the return address in response to the return instruction.

A branch history 210 turns a return hit signal on when detecting the return instruction, and instructs an output selection circuit 280 to acquire the return address of the return instruction not from the branch history 210 but from the return address stack 220.

FIG. 20 depicts a case of the step S102 executed by the program shown in FIG. 1. The return address stack 220 stores $\alpha+8$ as the return address in response to the return instruction in the sub-routine A that has been called by the call instruction at the address $\alpha$. In addition, the output selection circuit 280 can correctly select α+8 as the return address in response to the return instruction when the branch history 210 detects the return instruction is present at the address δ.

Figure 21:
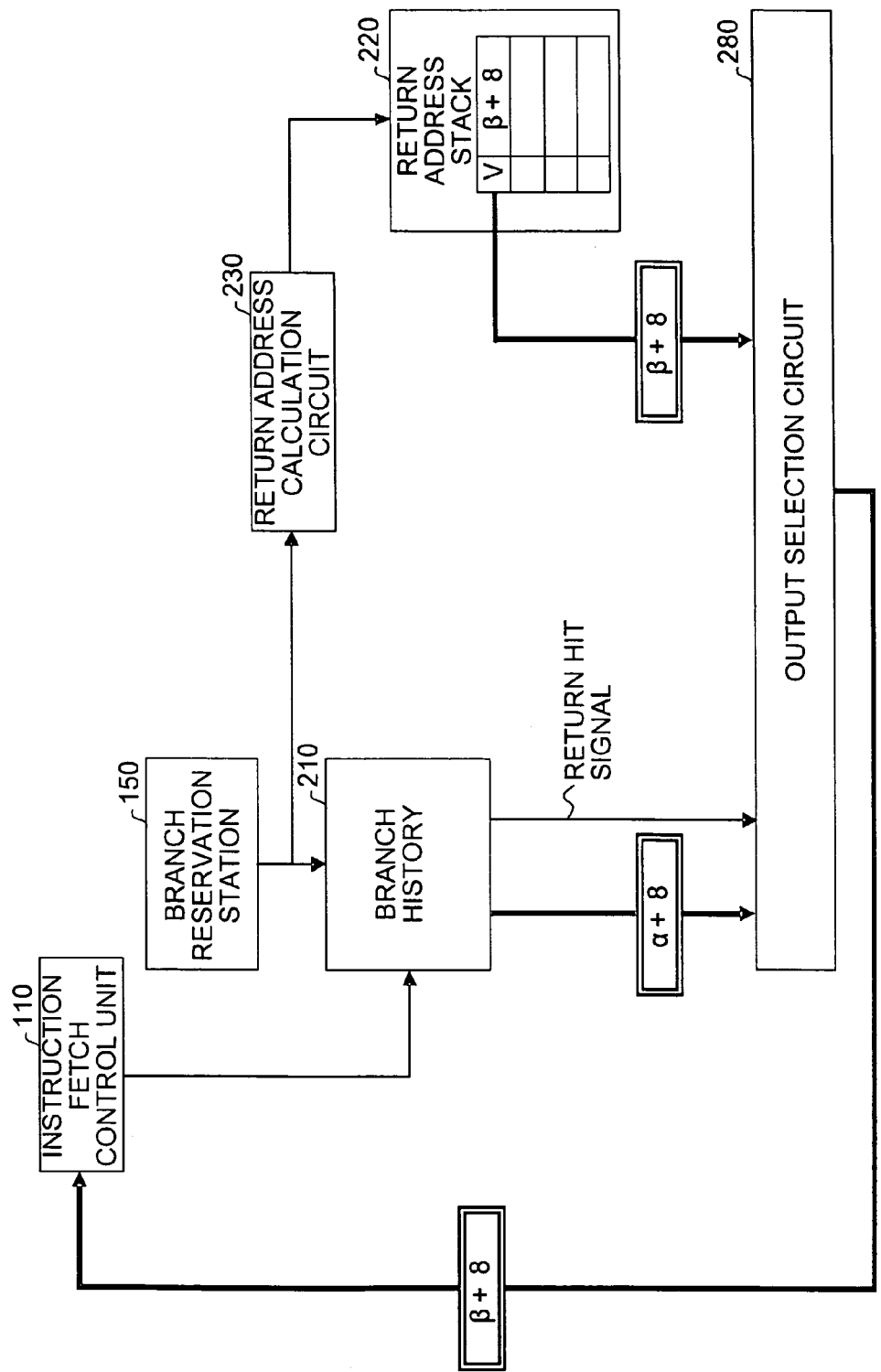
FIG. 21 is an explanatory view for a branch prediction when a second return instruction is detected by the conventional branch predicting method.

FIG. 21 is an explanatory view for a branch prediction when the second return instruction is detected in the conventional branch predicting method. FIG. 21 depicts a case of the step S104 executed by the program shown in FIG. 1. The return address in response to the return instruction at the address δ is α+8 on the case of FIG. 20, whereas the return address is β+8 on the case of FIG. 21.

The branch history 210 holds α+8 as the return address in response to the previous return instruction at the address δ. When execution of the call instruction at β is completed, β+8 is stored in the return address stack 220 and is used as the return address in response to the return instruction. No problem, therefore, occurs.

However, the branch history 210 often detects the presence of the return instruction at δ before the execution of the call instruction at β is completed by the advance reading of the instruction or the like by an instruction fetch control unit 110. If so, as shown in FIG. 22, no valid return target address is stored in the return address stack 220 and the address α+8 stored in the branch history is detected as the return address in response to the return instruction at the address δ. As a result, the prediction is missed.

As can be seen, by providing the return address stack 220, and storing the address of the instruction next to the call instruction in the return address stack 220 after the call instruction is executed, the correct return target address can be predicted in many cases when the return instruction is detected. Nevertheless, this conventional branch predicting method can stand improvement.

Figure 2:
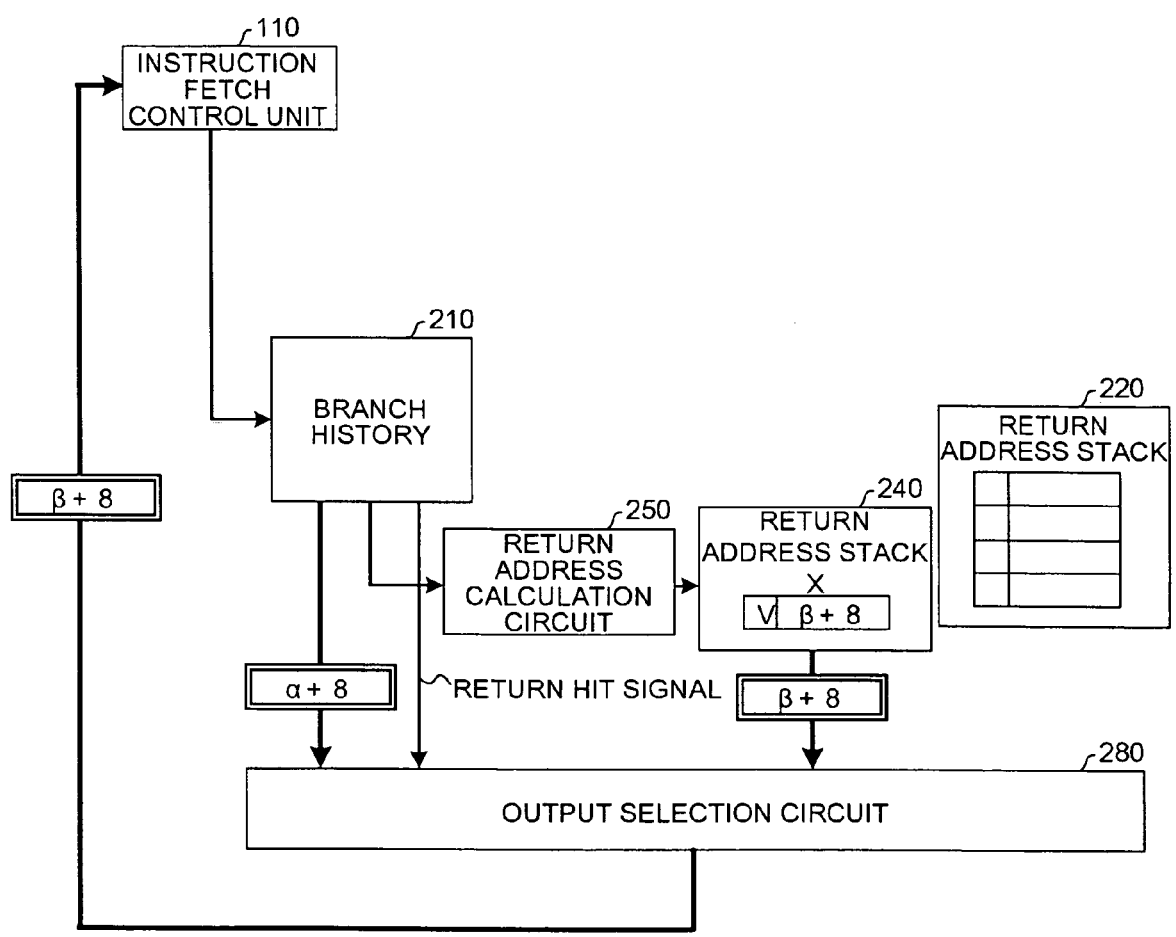
FIG. 2 is an explanatory view for a branch prediction when a second return instruction is detected by the branch predicting method according to the embodiment.

FIG. 2 is an explanatory view for a branch prediction when the second return instruction is detected by the branch predicting method according to the present embodiment. As shown in FIG. 2, the branch predicting method according to the present embodiment employs another return address stack (hereinafter, "return address stack X"), other than the return address stack 220.

In the branch predicting method according to the present embodiment, when the branch history 210 detects the call instruction, an address obtained by incrementing the address of the call instruction by +8 is stored in the return address stack X240 as the return address in response to the return instruction.

Timing at which the branch history 210 detects the call instruction is earlier than timing at which the return instruction corresponding to this call instruction is detected. Therefore, even in the case of FIG. 22, the address of the branch target in response to the return instruction can be correctly predicted using the value stored in the return address stack X240.

In FIG. 2, when the branch history 210 detects the call instruction at the address β, β+8 is stored in the return address stack X240 as the return address in response to the return instruction. Due to this, even if the branch history 210 detects the return instruction at the address δ before completion of the execution of the call instruction at the address β, the return address can be correctly predicted using the value stored in this return address stack X240.

As can be seen, by employing the return address stack X240, the accuracy for predicting the branch target in response to the return instruction can be improved, and a performance of the processor can be improved, accordingly.

Figure 3:
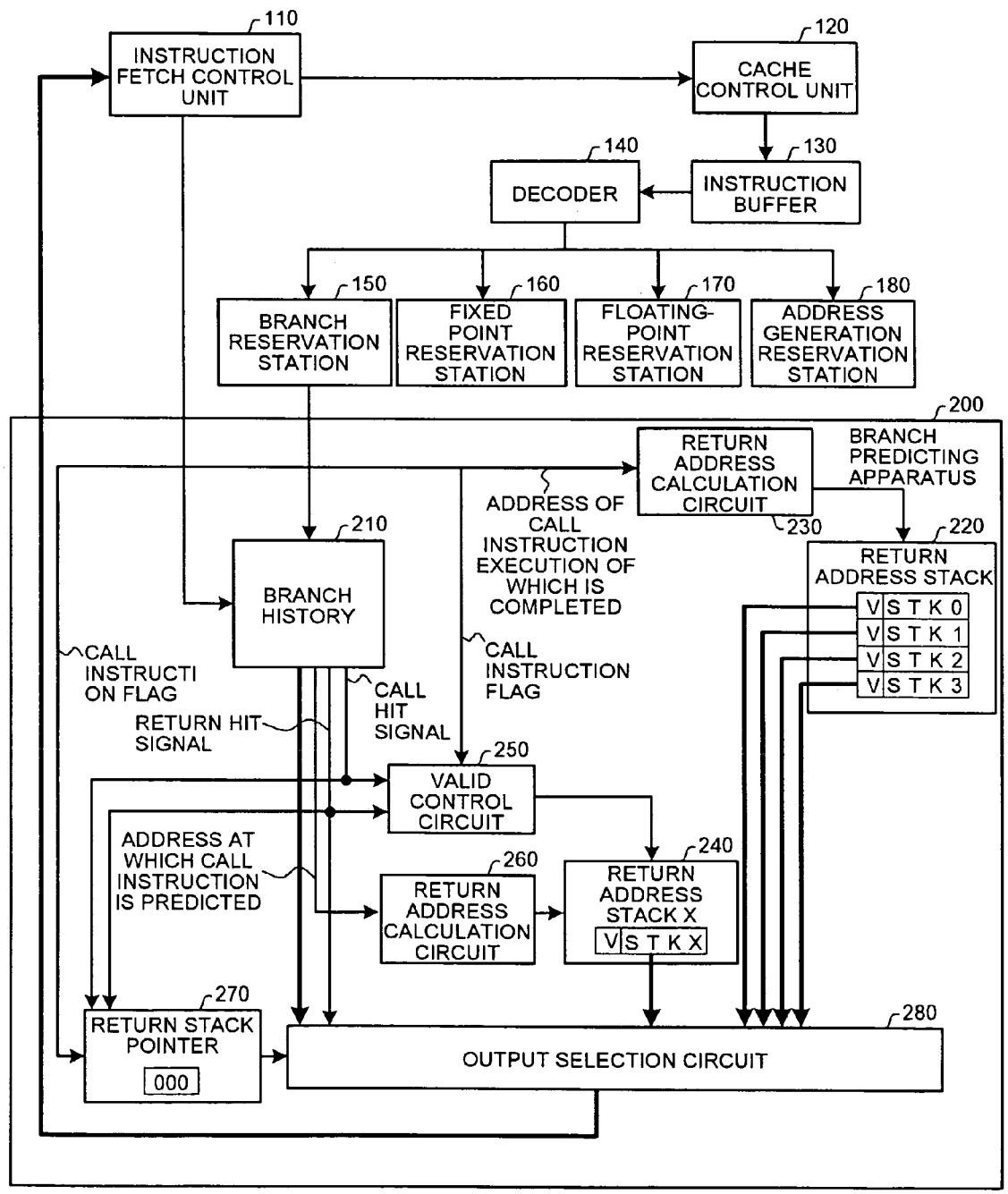
FIG. 3 is a block diagram of a configuration of a branch predicting apparatus according to the embodiment.

A configuration of a branch predicting apparatus according to the present embodiment will be explained next. FIG. 3 is a block diagram of the configuration of the branch predicting apparatus according to the present embodiment. As shown in FIG. 3, a branch predicting apparatus 200 is constituted to be connected to the instruction fetch control unit 110 and a branch reservation unit 150.

The instruction fetch control unit 110 is a unit that controls acquisition of an instruction executed in a pipeline. An instruction acquisition request made by the instruction fetch control unit 110 is transmitted to a cache control unit 120 for acquiring an actual instruction, and also transmitted to the branch history 210 in the branch predicting apparatus 200 for a branch prediction.

The cache control unit 120 is a unit that acquires the instruction requested by the instruction fetch control unit 110 from a cache or a main memory. The instruction acquired by the cache control unit 120, which instruction is temporarily stored in an instruction buffer 130, is then decoded by a decoder 140, and transmitted to one of reservation stations according to a type of the instruction.

The reservation stations include the branch reservation station 150, a fixed point reservation station 160, a floating-point operation reservation station 170, an address generation reservation station 180, and the like. The branch instruction is transmitted to and executed by the branch reservation station 150.

The branch predicting apparatus 200 includes the branch history 210, the return address stack 220, a return address calculation circuit 230, the return address stack X240, a valid control circuit 250, a return address calculation circuit 260, a return stack pointer 270, and the output selection circuit 280.

The branch history 210 is an apparatus that stores a pair of the address of the branch instruction executed by the branch reservation station 150 and the branch target in response to the branch instruction together with the other information flag. The call instruction or the return instruction is also a kind of the branch instruction, so that a branch result of the instruction is stored in the branch history 210.

When acquiring the address of the instruction from the instruction fetch control unit 110, the branch history 210 determines whether a branch is produced by the instruction included in the address while referring to its own information. If determining that the branch is produced, the branch history 210 transmits information on the address of the branch target and the like to the output selection circuit 280.

The return address stack 220 is an apparatus that stores, in a first-in last-out manner, the return address in response to the return instruction that corresponds to the call instruction executed by the branch reservation station 150. Each entry of the return address stack 220 includes a valid bit that indicates validity of the entry. While in the present embodiment, it is premised that the return address stack 220 includes four entries, the number of entries is not necessarily four.

The return address calculation circuit 230 is a circuit that performs an arithmetic operation for converting the address of the call instruction transmitted from the branch reservation station 150 into the return address, and that transmits the resultant address to the return address stack 220. As already explained, while the return address in response to the return instruction is the address obtained by incrementing the call instruction by +8 in the processor explained in the present embodiment, a processor of a different specification may often use a different conversion method.

The return address stack X240 is an apparatus that stores, in the first-in last-out manner, the return address in response to the return instruction that corresponds to a call instruction when the branch history 210 detects the call instruction. Each entry of the return address stack X240 includes a valid bit that indicates validity of the entry. In the present embodiment, it is premised that the return address stack X240 includes one entry. However, the number of entries may be two or more.

The valid control circuit 250 is a circuit that controls a state of the valid bit in the entry of the return address stack X240. The valid control circuit 250 changes the state of the valid bit in the entry of the return address stack X240 according to a state of the call hit signal or the like from the branch history 210.

Figure 4:
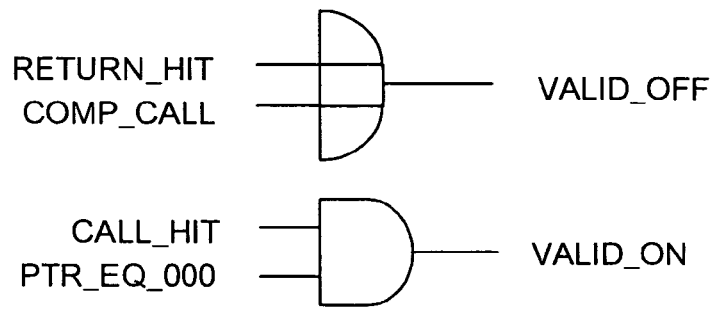
FIG. 4 is a block diagram of a configuration of a valid control circuit shown in FIG. 3.

FIG. 4 is a block diagram of a configuration of the valid control circuit 250 shown in FIG. 3. As shown in FIG. 4, the valid control circuit 250 changes the state of the valid bit in the entry of the return address stack 240 to an ON-state when the call hit signal from the branch history 210 is turned on and a value of the return stack pointer 270 is 111.

In addition, the valid control circuit 250 changes the state of the valid bit to an OFF-state when the return hit signal from the branch history 210 is turned on or a call instruction flag from the branch reservation station 150 is turned on. This is because the information in the entry of the return address stack X240 is already used when the branch history 210 detects the return instruction, and the information in the return address stack 220 is valid when the branch reservation station 150 completes the execution of the call instruction.

The return address calculation circuit 260 is a circuit that performs an arithmetic operation for converting the address of the call instruction detected by the branch history 210 into the return address in response to the return instruction, and that transmits the resultant address to the return address stack X240. Similarly to the return address calculation circuit 230, while the return address in response to the return instruction is the address obtained by incrementing the call instruction by +8 in the processor explained in the present embodiment, a processor of a different specification may often use a different conversion method.

The return stack pointer 270 is an apparatus that holds a value that indicates the entry of the return address stack to be used when the return instruction is detected. Specifically, when the value held by the return stack pointer 270 is 000, 001, 010, or 011, this indicates that the entry STK0, STK1, STK2, or STK3 of the return address stack 220 is to be used, respectively. When the value is 111, this indicates that the entry of the return address stack X240 is to be used.

Figure 5:
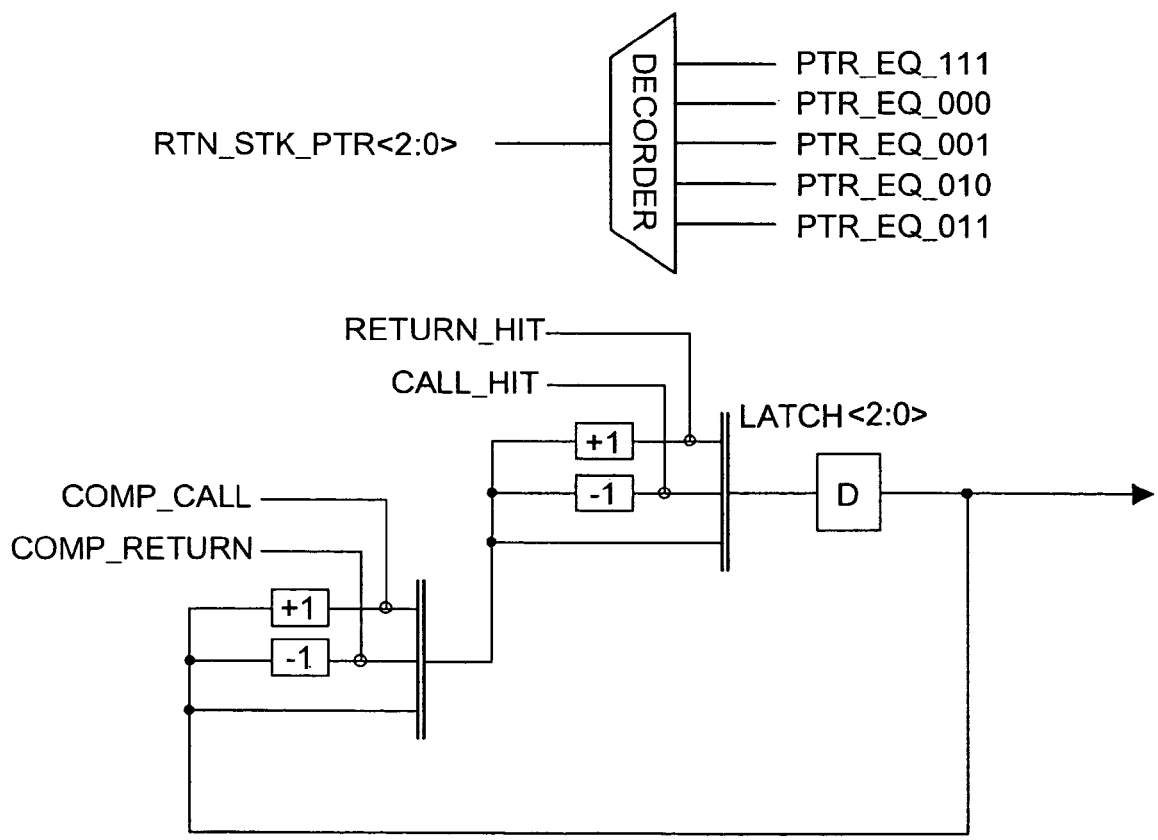
FIG. 5 is a block diagram of a configuration of a return stack pointer shown in FIG. 3.

FIG. 5 is a block diagram of a configuration of the return stack pointer 270 shown in FIG. 3. As shown in FIG. 5, the return stack pointer 270 includes a latch composed by three bits of <2:0>, and a signal according to a state of this latch is turned on and transmitted.

A value of the latch, which is 000 in an initial state, is incremented by +1 whenever a call completion signal from the branch reservation station 150 is turned on, and decremented by −1 whenever a return completion signal is turned on. In addition, the value of the latch is decremented by −1 whenever the call hit signal from the branch history 210 is turned on, and incremented by +1 whenever the return hit signal is turned on.

It is assumed that, when the number of entries of the return address stack 220 and the number of entries of the return address stack X240 are increased, the number of bits of the latch of the return stack pointer 270 is increased to a width which can specify the increased entries.

The output selection circuit 280 is a circuit that selects appropriate branch information from among a plurality of pieces of branch information, and that transmits the selected branch information to the instruction fetch control unit 110. Specifically, when the branch history 210 detects the return instruction, the output selection circuit 280 transmits the address of the entry pointed at by the return stack pointer 270 to the instruction fetch control unit 110 as the return address in response to the return instruction.

Figure 6:
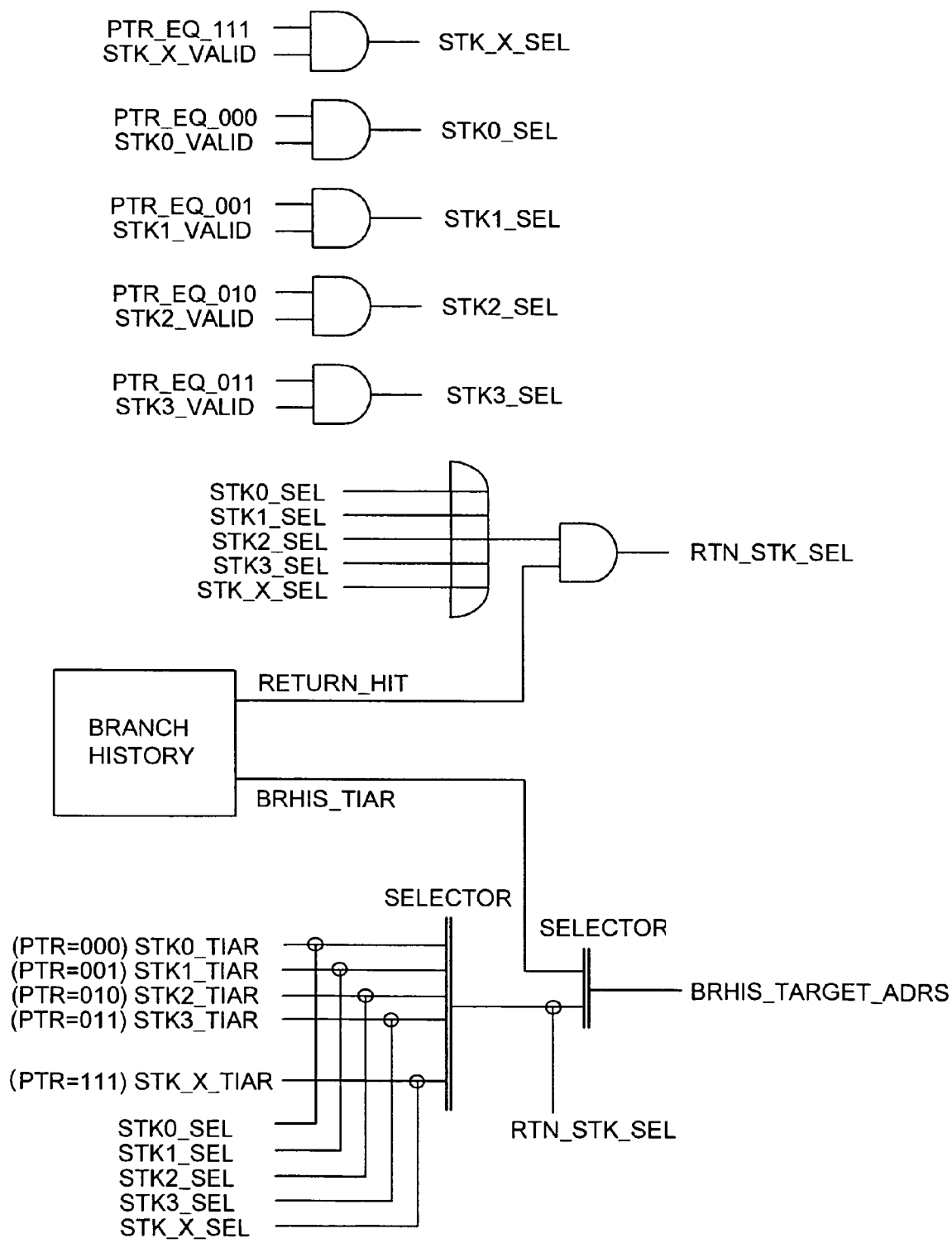
FIG. 6 is a block diagram of a configuration of an output selection circuit shown in FIG. 3.

FIG. 6 is a block diagram of a configuration of the output selection circuit 280 shown in FIG. 3. As shown in FIG. 6, the output selection circuit 280 includes two selectors. A first selector is a circuit that selects a valid entry from among the entries of the return address stack 220 and the return address stack X240 based on the value of the return stack pointer 270 and the state of the valid bit in each entry.

A second selector is a circuit that determines whether the return hit signal from the branch history 210 is valid, selects a selection result of the first selector as the address of the branch target when the return hit signal is valid, and selects the address predicted by the branch history 210 as the address of the branch target when the return hit signal is not valid.

Figure 7:
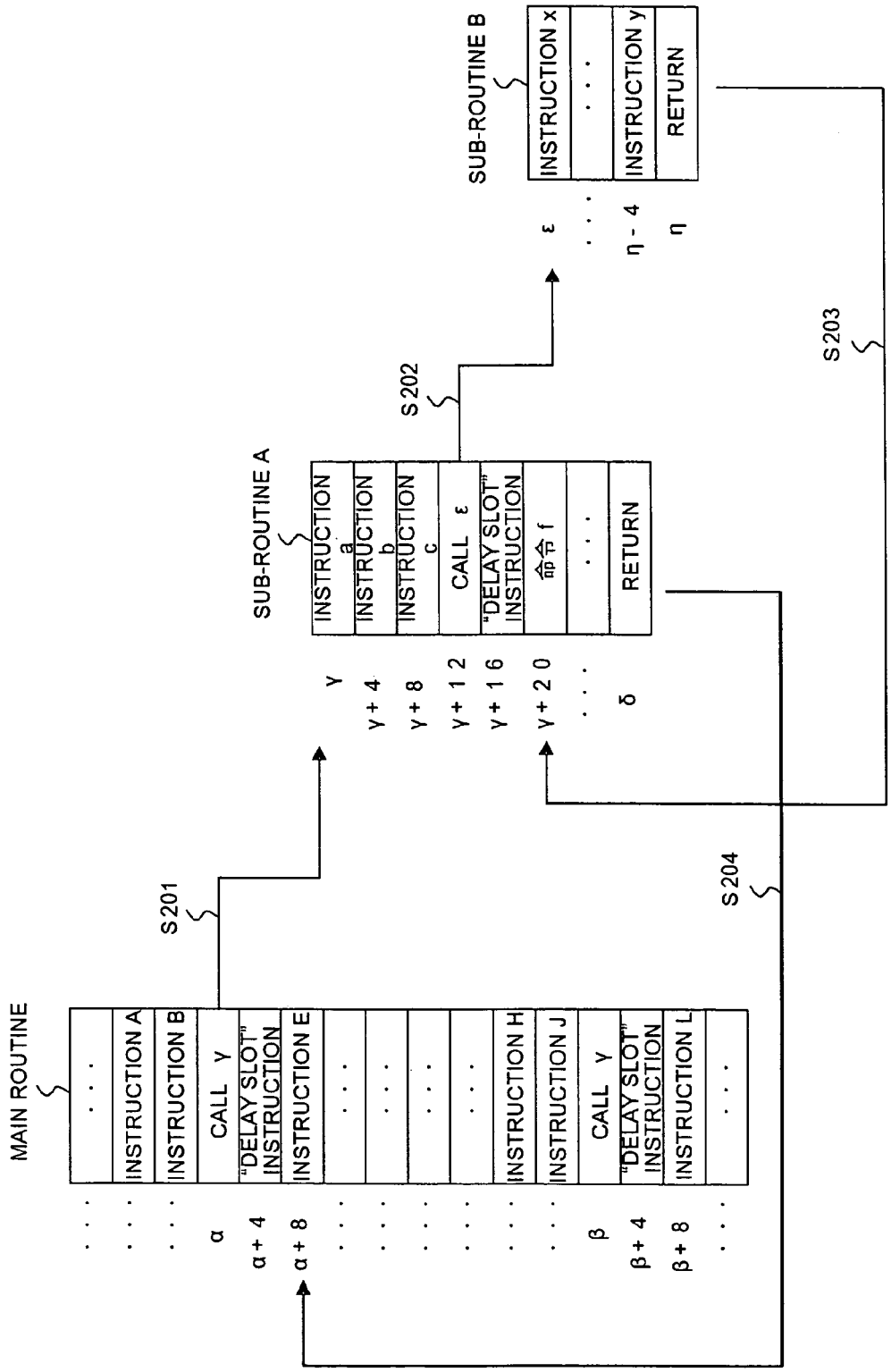
FIG. 7 is an explanatory view for a program used to explain operations performed by the branch predicting apparatus shown in FIG. 3.

Specific operations performed by the branch predicting apparatus 200 shown in FIG. 3 will be explained. FIG. 7 is an explanatory view for the program used to explain the operations performed by the branch predicting apparatus 200 shown in FIG. 3.

As shown in FIG. 7, this program executes a call instruction for calling the sub-routine A, at the address α (at a step S201). The sub-routine A executes a call instruction for calling a sub-routine B, at an address γ+12 (at a step S202).

The sub-routine B ends in response to a return instruction at an address η, and the program returns to an address γ+20 in the sub-routine A (at a step S203). The sub-routine A ends in response to a return instruction at the address δ, and the program returns to the address α+8 in the main routine to continue a processing (at a step S204).

Figure 8:
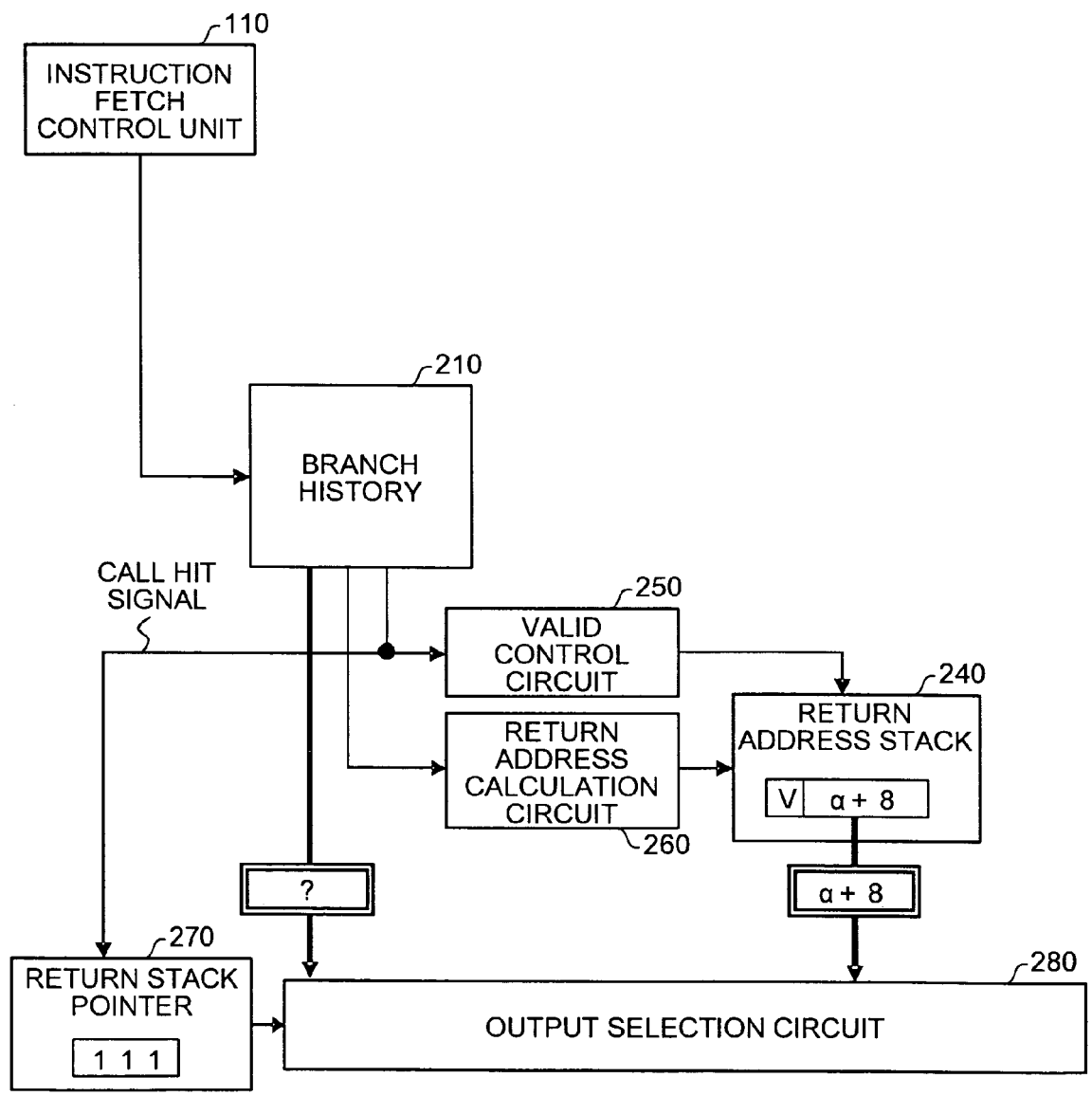
FIG. 8 is an explanatory view for the operation performed by the branch predicting apparatus shown in FIG. 3 when a call instruction is fetched at a step S201.

FIG. 8 is an explanatory view for the operations performed by the branch predicting apparatus 200 shown in FIG. 3 when the call instruction is fetched at the step S201. As shown in FIG. 8, the instruction fetch control unit 110 transmits an indication to acquire an instruction to the cache control unit 120, and also transmits an address of the instruction to the branch history 210.

When the branch history 210 refers to the branch history held in and detects that the call instruction is present at the transmitted address α, then the branch history 210 turns the call hit signal on, and transmits the address α at which the presence of the call instruction is detected, to the return address calculation circuit 260.

The return address calculation circuit 260 transmits the value obtained by converting the received address into the return address in response to the return instruction, to the return address stack X240, and this value is stored in the entry of the return address stack X240.

Since the call hit signal from the branch history 210 is turned on and the value of the return stack pointer 270 is 000, the valid bit in the entry of the return address stack X240 is turned on. Further, since the call hit signal is turned on, the value of the return stack pointer 270 is decremented by −1 to 111, so that the entry of the return address stack X240 is designated as a target for acquiring the return address in response to the return instruction.

In this way, when the branch history 210 detects the presence of the call instruction, the return address in response to the return instruction is stored in the return address stack X240, and the value is used when the branch history 210 detects the presence of the return instruction.

Figure 9:
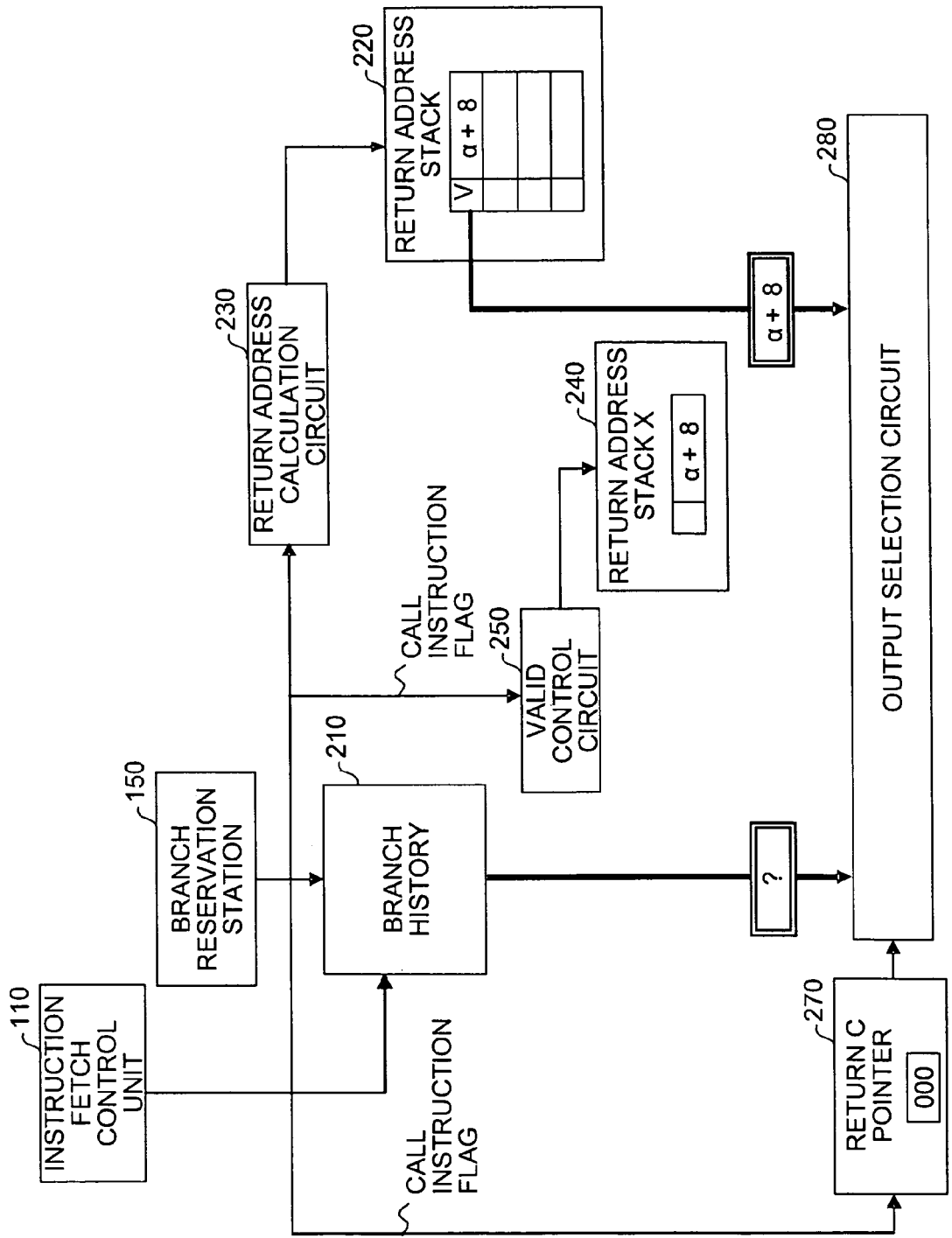
FIG. 9 is an explanatory view for the operations performed by the branch predicting apparatus shown in FIG. 3 when the call instruction is executed at a step S210.

In the present embodiment, it is assumed that the execution of the call instruction at the address α is completed before the branch history 210 detects the return instruction at the address δ. FIG. 9 is an explanatory view for the operations performed by the branch predicting apparatus 200 shown in FIG. 3 when the call instruction is executed at the step S210. As shown in FIG. 9, when the branch reservation station 150 completes the execution of the call instruction, information on a branch produced by the call instruction is stored in the branch history 210.

Further, the address α of the call instruction the execution of which is completed is transmitted to the return address calculation circuit 230. The return address calculation circuit 230 transmits the value obtained by converting the received address into the return address in response to the return instruction, to the return address stack 220, and pushes in this value to the leading entry of the return address stack 220.

Furthermore, the call instruction flag from the branch reservation station 150 is turned on, and the valid control circuit 250 thereby turns off the valid bit in the entry of the return address stack X240. The value of the return address stack pointer 270 is incremented by +1 to 000, so that the return address stack pointer 270 designates the leading entry of the return address stack 220 as a target for acquiring the return address in response to the return instruction.

In this way, when the branch reservation station 150 completes the execution of the call instruction, the return address in response to the return instruction is stored in the return address stack 220, and the value is used when the branch history 210 detects the presence of the return instruction.

Figure 10:
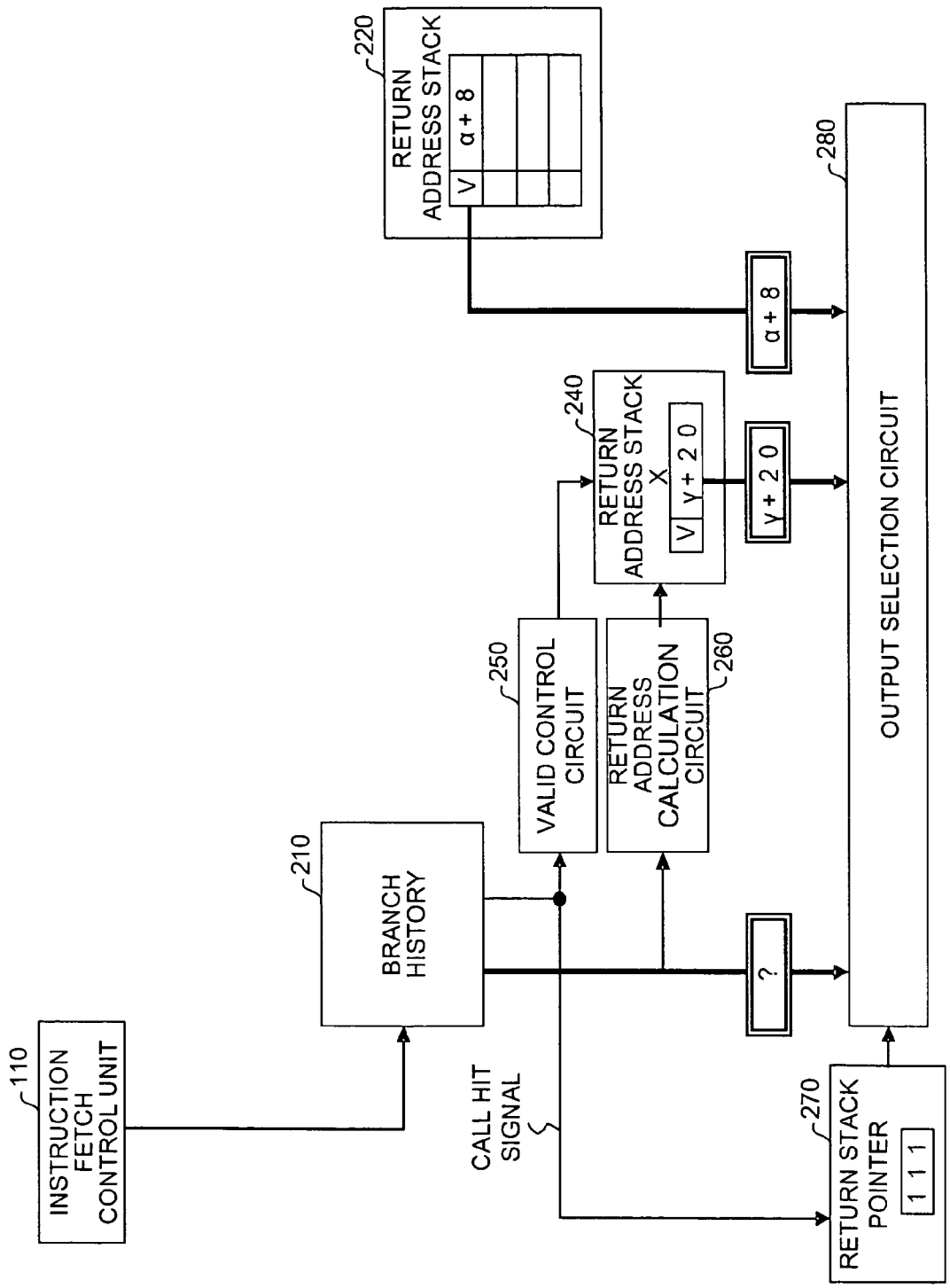
FIG. 10 is an explanatory view for the operations performed by the branch predicting apparatus shown in FIG. 3 when the call instruction is fetched at a step S202.

It is then assumed that the instruction fetch control unit 110 indicates fetching of an instruction at the address γ+12. FIG. 10 is an explanatory view for the operations performed by the branch predicting apparatus 200 shown in FIG. 3 when the call instruction is fetched at the step S202.

When the branch history 210 detects the presence of the call instruction at the address γ+12, then the same operations as those in FIG. 8 are performed, γ+20 is stored in the return address stack X240 as the return address in response to the return instruction, and the valid bit is turned on. Further, the value of the return stack pointer 270 is decremented by −1, so that the return stack pointer 270 designates the entry of the return address stack X240 as a valid location for storing the return address in response to the return instruction.

The address α+8 that is stored when the execution of the call instruction at the address α is completed is held in the leading entry of the return address stack 220, and the valid bit of the leading entry is turned on. However, since the return stack pointer 270 points at another entry, the information stored in the return address stack 220 is not selected as the return address in response to the return instruction in this case.

Figure 11:
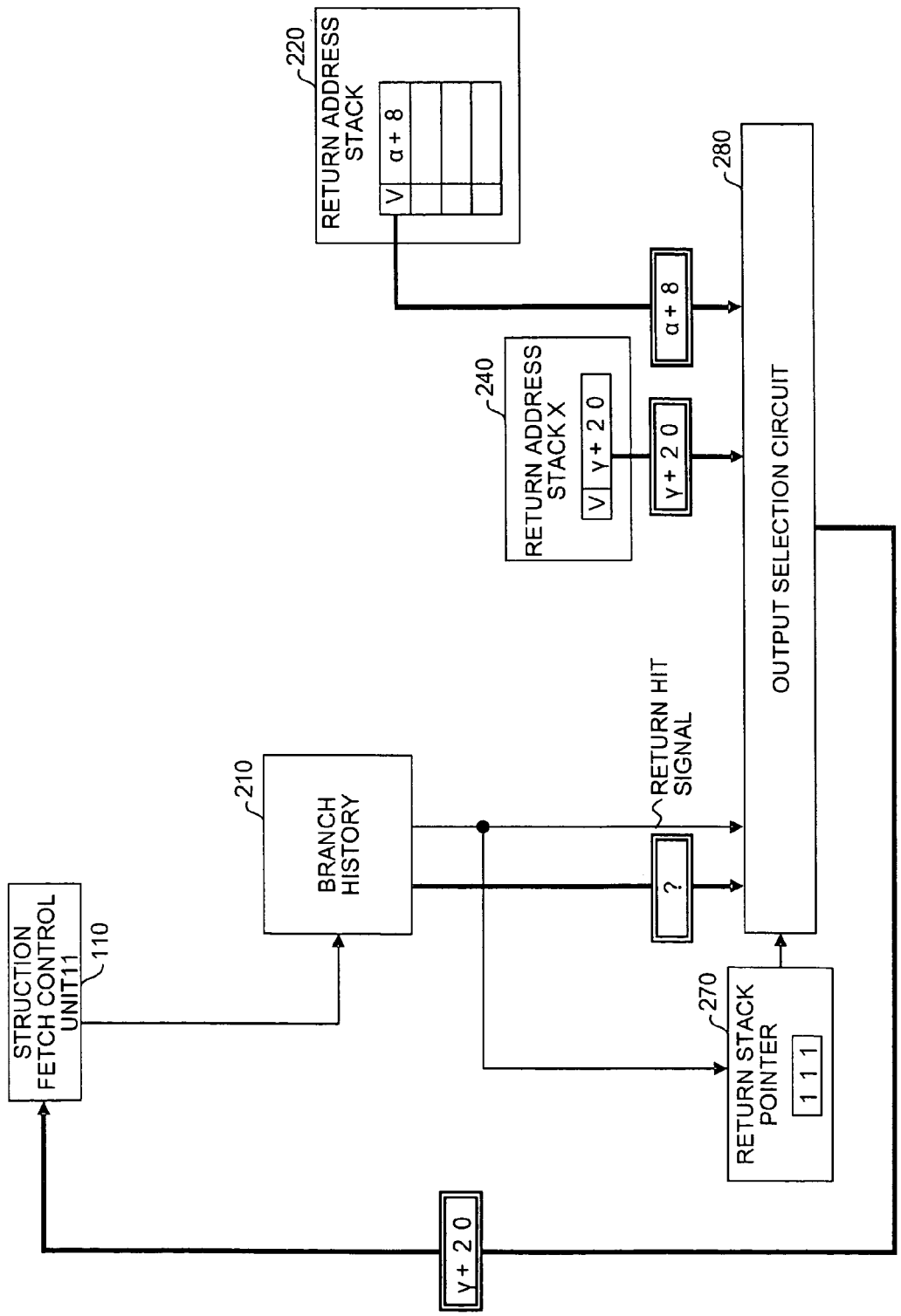
FIG. 11 is an explanatory view for the operations performed by the branch predicting apparatus shown in FIG. 3 when a return instruction is fetched at a step S203.

It is assumed herein that the branch history 210 detects the return instruction at the address η before the execution of the call instruction at the address γ+12 is completed. FIG. 11 is an explanatory view for the operations performed by the branch predicting apparatus 200 shown in FIG. 3 when the return instruction is fetched at the step S203.

As shown in FIG. 11, the branch history 210 that detects the return instruction turns the return hit signal on. The output selection circuit 280 thereby selects the return address in response to the return instruction, and transmits the selected address to the instruction fetch control unit 110.

In this case, the value of the return stack pointer 270 is 111, and the return stack pointer 270 designates the entry of the return address stack X240 as the location for storing the return address in response to the return instruction. Therefore, the output selection circuit 280 transmits the address γ+20 held in the entry of the return address stack X240 to the instruction fetch control unit 110 as the return address in response to the return instruction.

The address γ+20 is a correct return address in response to the return instruction at the address η. When the return address stack X240 is not present, then there is no avoiding predicting the return address in response to the previous return instruction at η that is held in the branch history as the branch target, and an erroneous branch prediction may possibly be made. However, due to the presence of the return address stack X240, a correct branch prediction can be made.

Figure 12:
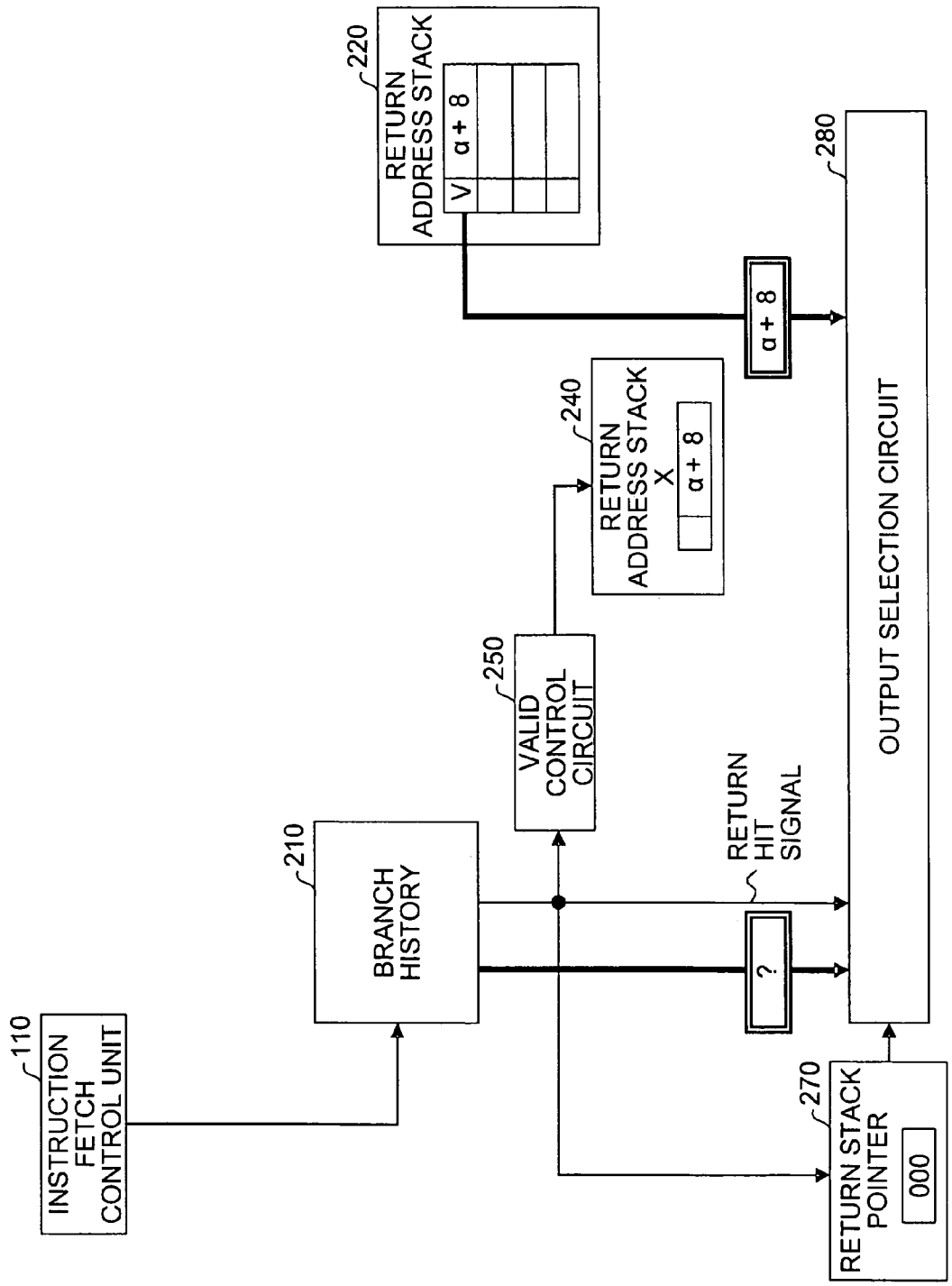
FIG. 12 is an explanatory view for the operations performed by the branch predicting apparatus shown in FIG. 3 after the return instruction is detected at the step S203.

FIG. 12 is an explanatory view for the operations performed by the branch predicting apparatus 200 shown in FIG. 3 after the return instruction is detected at the step S203. As shown in FIG. 12, since the return hit signal is turned on, the value of the return stack pointer 270 is incremented by +1 to 000, and the return stack pointer 270 points at the leading entry of the return address stack 220.

Further, since the return hit signal is turned on, the valid control circuit 250 changes the state of the valid bit of the entry of the return address stack X240 to an OFF-state, thereby invalidating this entry.

As can be seen, after the output selection circuit 280 transmits the value held in the entry of the return address stack X240 to the instruction fetch control unit 110 as the return address in response to the return instruction, the entry of the return address stack X240 is invalidated. In addition, the return stack pointer 270 designates at the entry of the return address stack 220 as a valid entry.

Figure 13:
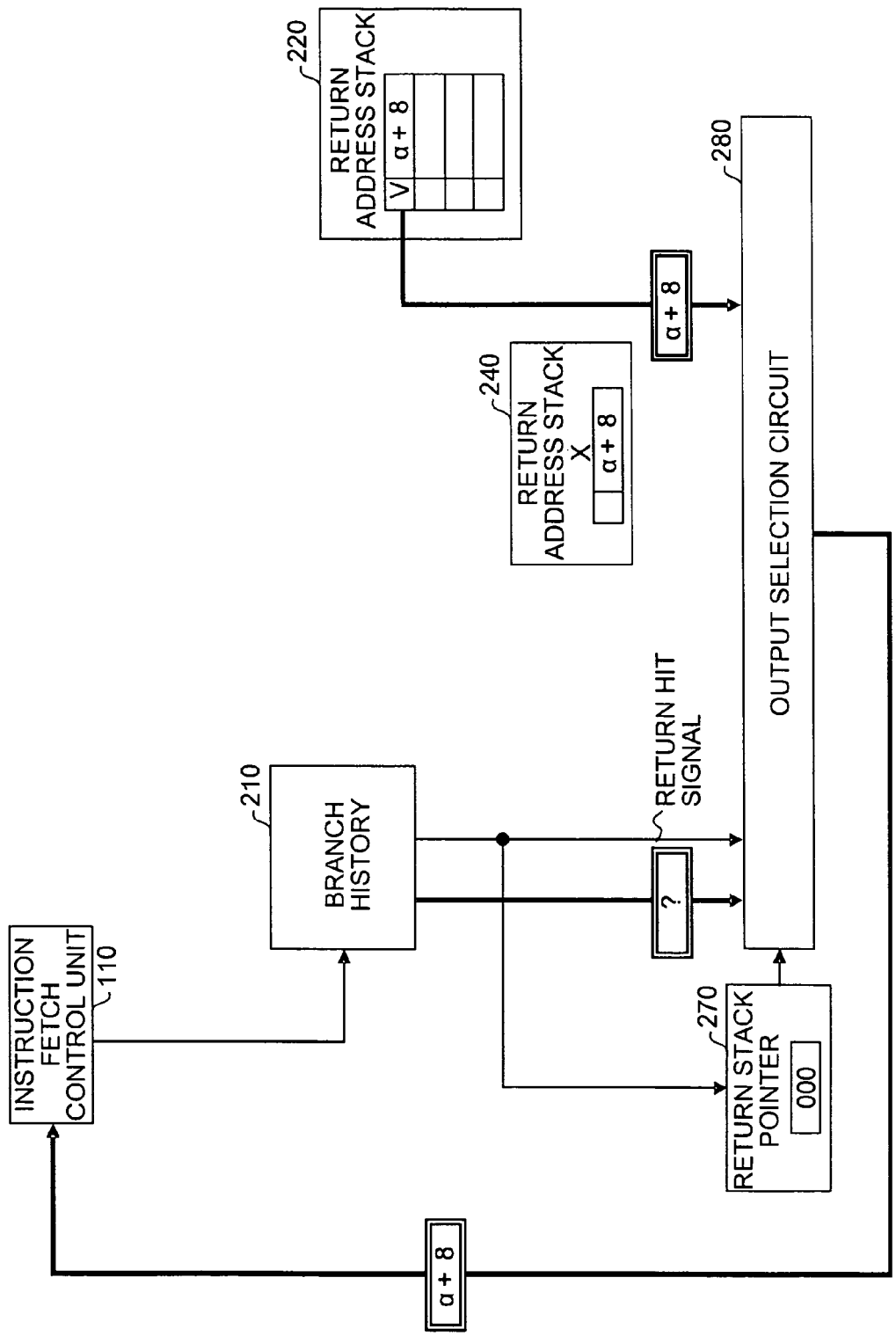
FIG. 13 is an explanatory view for the operations performed by the branch predicting apparatus shown in FIG. 3 when the return instruction is fetched at a step S204.

It is then assumed herein that the branch history 210 detects the return instruction at the address δ. FIG. 13 is an explanatory view for the operations performed by the branch predicting apparatus 200 shown in FIG. 3 when the return instruction is fetched at the step S204.

As shown in FIG. 13, the branch history 210 that detects the return instruction turns the return hit signal on. The output selection circuit 280 thereby selects the return address in response to the return instruction, and transmits the selected address to the instruction fetch control unit 110.

In this case, the value of the return stack pointer 270 is 000 and this value indicates that the leading entry of the return address stack 220 is valid. Therefore, the output selection circuit 280 transmits the address α+8 held in the leading entry of the return address stack 220 to the instruction fetch control unit 110 as the return address in response to the return instruction.

The address α+8 is a correct return address in response to the return instruction at the address δ, so that the branch predicting method according to the present embodiment enables performing the correct branch prediction. In the case of FIG. 11, even if the execution of the call instruction at the address γ+12 is completed before the return instruction at the address η is detected, the return address stack 220 and the return stack pointer 270 function to ensure the correct branch prediction.

As explained above, according to the first embodiment, the return address stack X240 is provided so as to store the return address in response to the return instruction in the return address stack X240 when the branch history 210 detects the call instruction. Therefore, even if the return instruction is detected before the execution of the call instruction is completed, the correct branch prediction can be made, and the accuracy for the branch prediction can be improved, accordingly.

Although in the first embodiment, the example of employing the return address stack X in combination with the return address stack has been explained, the return address stack X may also be employed independently. An example of employing only the return address stack X will now be explained.

Figure 14:
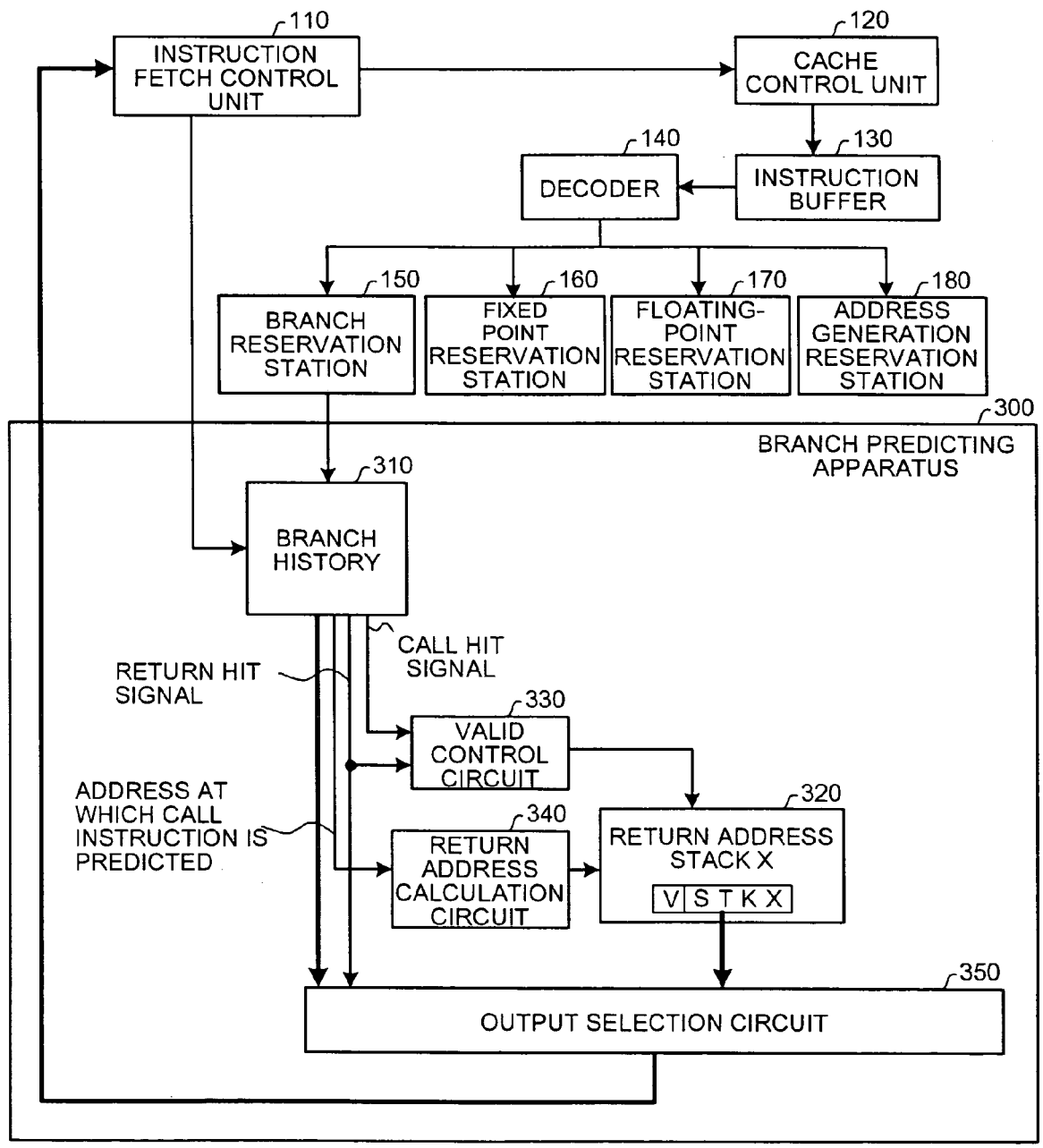
FIG. 14 is a block diagram of a configuration of the branch predicting apparatus according to another embodiment of the present invention.

FIG. 14 is a block diagram of the configuration of the branch predicting apparatus according to a second embodiment of the present invention.

Since the apparatuses exterior of a branch predicting apparatus 300 are equal to those according to the first embodiment, only the interior of the branch predicting apparatus 300 will be explained. As shown in FIG. 14, the branch predicting apparatus 300 includes a branch history 310, a return address stack X320, a valid control circuit 330, a return address calculation circuit 340, and an output selection circuit 350.

The branch history 310 is an apparatus that stores a pair of the address of the branch instruction executed by the branch reservation station 150 and the branch target in response to the instruction together with the other information flag. The call instruction and the return instruction are also a kind of branch instruction, so that a branch result of the instruction is stored in the branch history 310.

When acquiring the address of the instruction from the instruction fetch control unit 110, the branch history 310 determines whether a branch is produced by the instruction included in the address while referring to its own information. If determining that the branch is produced, the branch history 310 transmits information on the address of the branch target and the like to the output selection circuit 350.

The return address stack X320 is an apparatus that stores, in a first-in last-out manner, the return address in response to the return instruction that corresponds to the call instruction when the branch history 310 detects the call instruction. Each entry of the return address stack 320 includes a valid bit that indicates validity of the entry. While in the present embodiment, it is premised that the return address stack X320 includes one entry, the number of entries may also be two or more.

The valid control circuit 330 is a circuit that controls a state of the valid bit in the entry of the return address stack X320. The valid control circuit 330 turns on the valid bit in the entry of the return address stack X320 when the call hit signal from the branch history 310 is turned on, and turns off the valid bit when the return hit signal is turned on.

The return address calculation circuit 340 is a circuit that performs an arithmetic operation for converting the address of the call instruction detected by the branch history 310 into the return address in response to the return instruction, and that transmits the resultant address to the return address stack X320. While the return address in response to the return instruction is the address obtained by incrementing the call instruction by +8 in the processor explained in the present embodiment, a processor of a different specification may often use a different conversion method.

The output selection circuit 350 is a circuit that selects appropriate branch information from among a plurality of pieces of branch information, and that transmits the selected branch information to the instruction fetch control unit 110. Specifically, when the branch history 310 detects the return instruction, the return hit signal is turned on, and the valid bit of the entry of the return address stack X320 is turned on, then the output selection circuit 350 transmits the address held in the entry of the return address stack X320 as the return address in response to the return instruction.

Specific operations performed by the branch predicting apparatus 300 shown in FIG. 14 will be explained. The operations will be explained herein, with reference to the program shown in FIG. 1.

Figure 15:
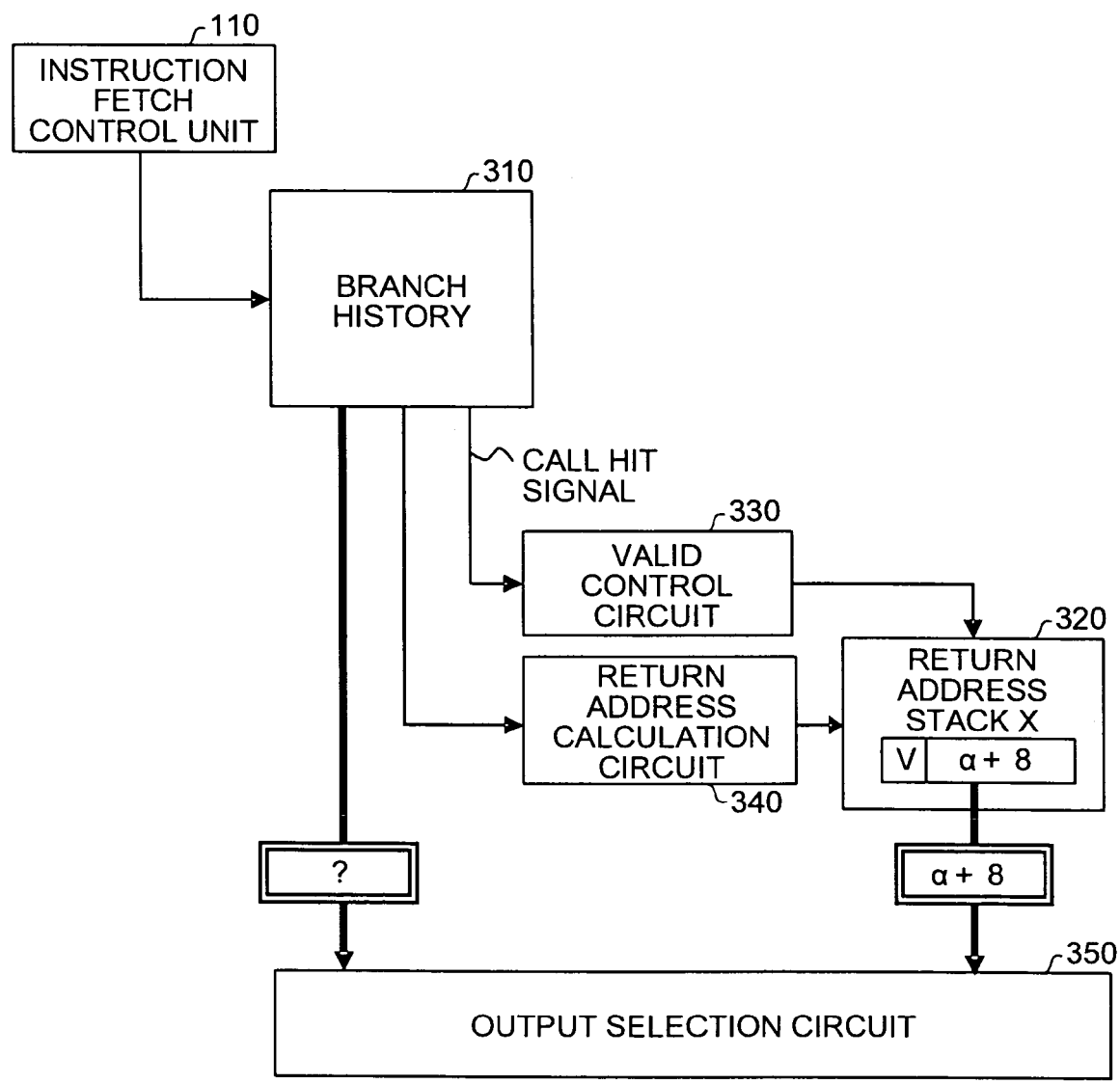
FIG. 15 is an explanatory view for operations performed by the branch predicting apparatus shown in FIG. 14 when the call instruction is fetched at a step S101.

FIG. 15 is an explanatory view for the operations performed by the branch predicting apparatus 300 shown in FIG. 14 when the call instruction is fetched at the step S101. As shown in FIG. 15, the instruction fetch unit 110 transmits an indication to acquire an instruction to the cache control unit 120, and also transmits an address of the instruction to the branch history 310.

When the branch history 310 refers to the branch history held in and detects that the call instruction is present at the transmitted address α, then the branch history 310 turns the call hit signal on, and transmits the address α at which the presence of the call instruction is detected, to the return address calculation circuit 340.

The return address calculation circuit 340 transmits the value obtained by converting the received address into the return address in response to the return instruction, to the return address stack X320, and this value is stored in the entry of the return address stack X320.

Since the call hit signal from the branch history 310 is turned on, the valid control circuit 330 changes the state of the valid bit in the entry of the return address stack X320 to an ON-state.

In this way, when the branch history 310 detects the presence of the call instruction, the return address in response to the return instruction is stored in the return address stack X320, and the value is used when the branch history 310 detects the presence of the return instruction.

Figure 16:
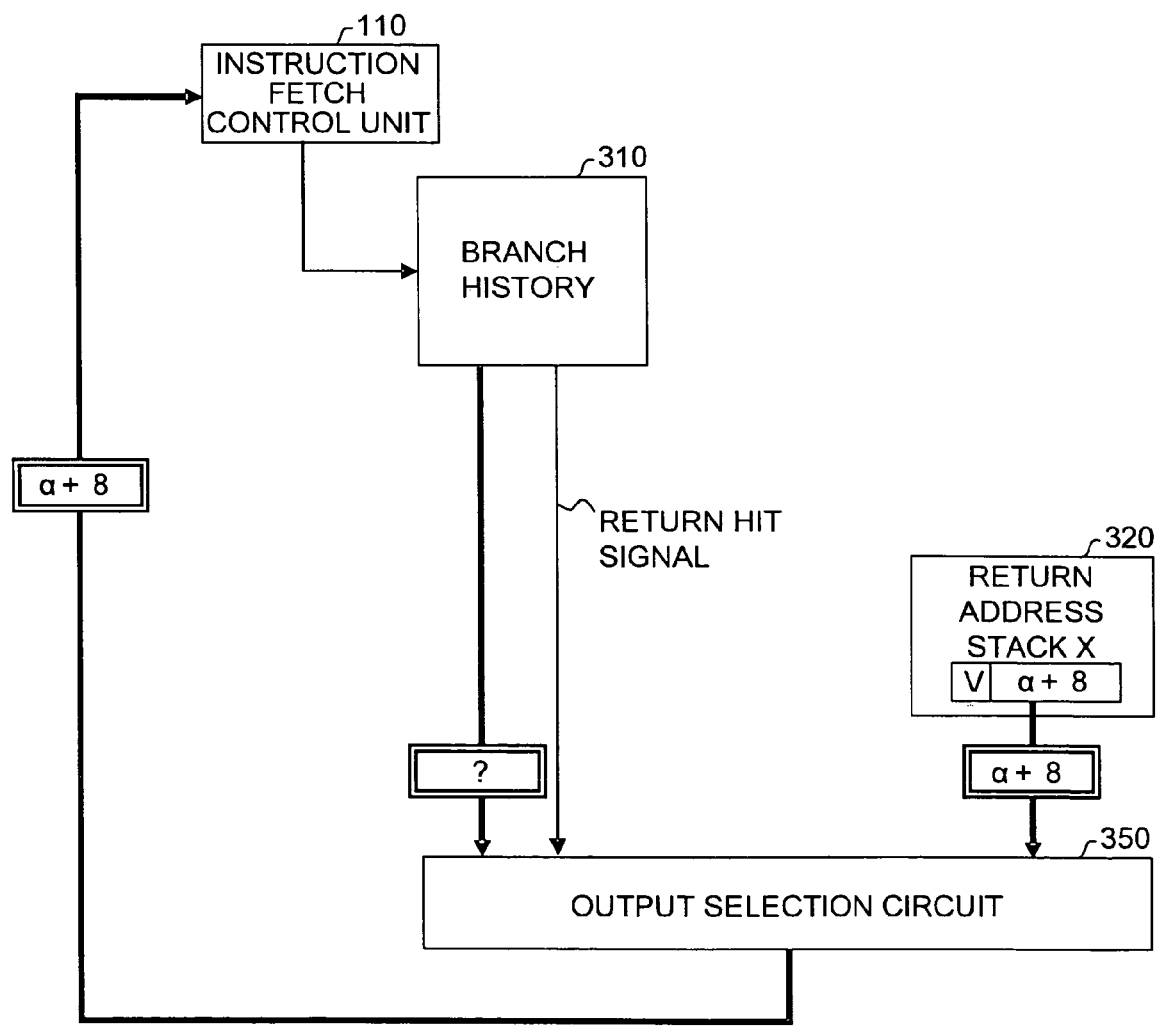
FIG. 16 is an explanatory view for the operations performed by the branch predicting apparatus shown in FIG. 14 when the return instruction is fetched at a step S102.

It is then assumed that the branch history 310 detects the return instruction at the address δ. FIG. 16 is an explanatory view for the operations performed by the branch predicting apparatus 300 shown in FIG. 14 when the return instruction is fetched at the step S102.

As shown in FIG. 14, the branch history 310 that detects the return instruction turns the return hit signal on. The output selection circuit 350 thereby selects the return address in response to the return instruction, and transmits the selected address to the instruction fetch control unit 110.

In this case, the valid bit in the entry of the return address stack X320 is turned on, and this indicates that this entry is valid. Therefore, the output selection circuit 350 transmits the address α+8 held in the entry of the return address stack X320 to the instruction fetch control unit 110 as the return address in response to the return instruction.

Figure 17:
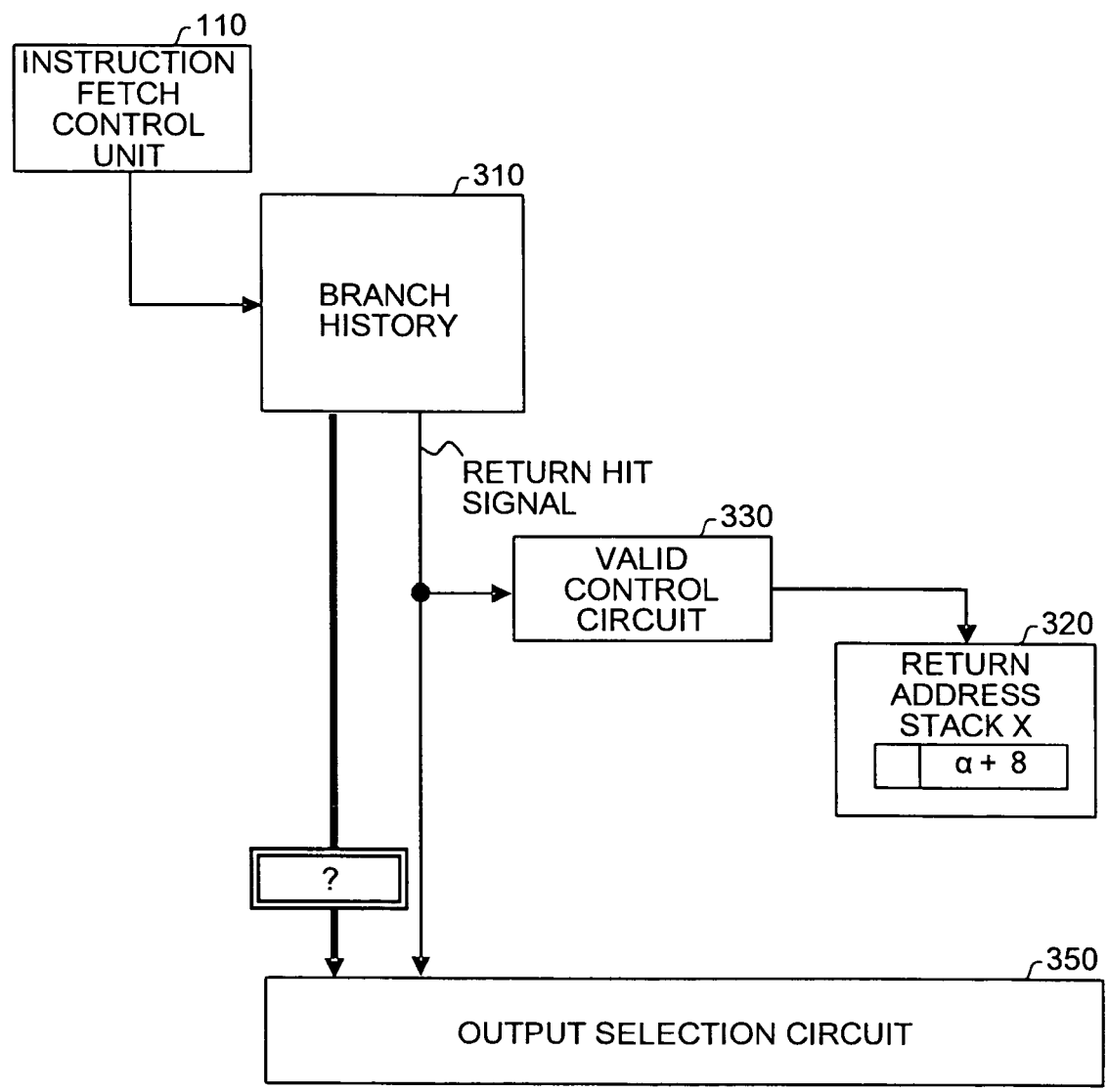
FIG. 17 is an explanatory view for the operations performed by the branch predicting apparatus shown in FIG. 14 after the return instruction is detected at the step S102.

FIG. 17 is an explanatory view for the operations performed by the branch predicting apparatus 300 shown in FIG. 14 after the return instruction is detected at the step S102. As shown in FIG. 17, since the return hit signal is turned on, the valid control circuit 330 changes the state of the valid bit in the entry of the return address stack X320 into an OFF-state, thereby invalidating this entry.

As can be seen, by invalidating the used entry of the return address stack X320, reuse of the value held in the entry of the return address stack X320 is prevented.

Figure 18:
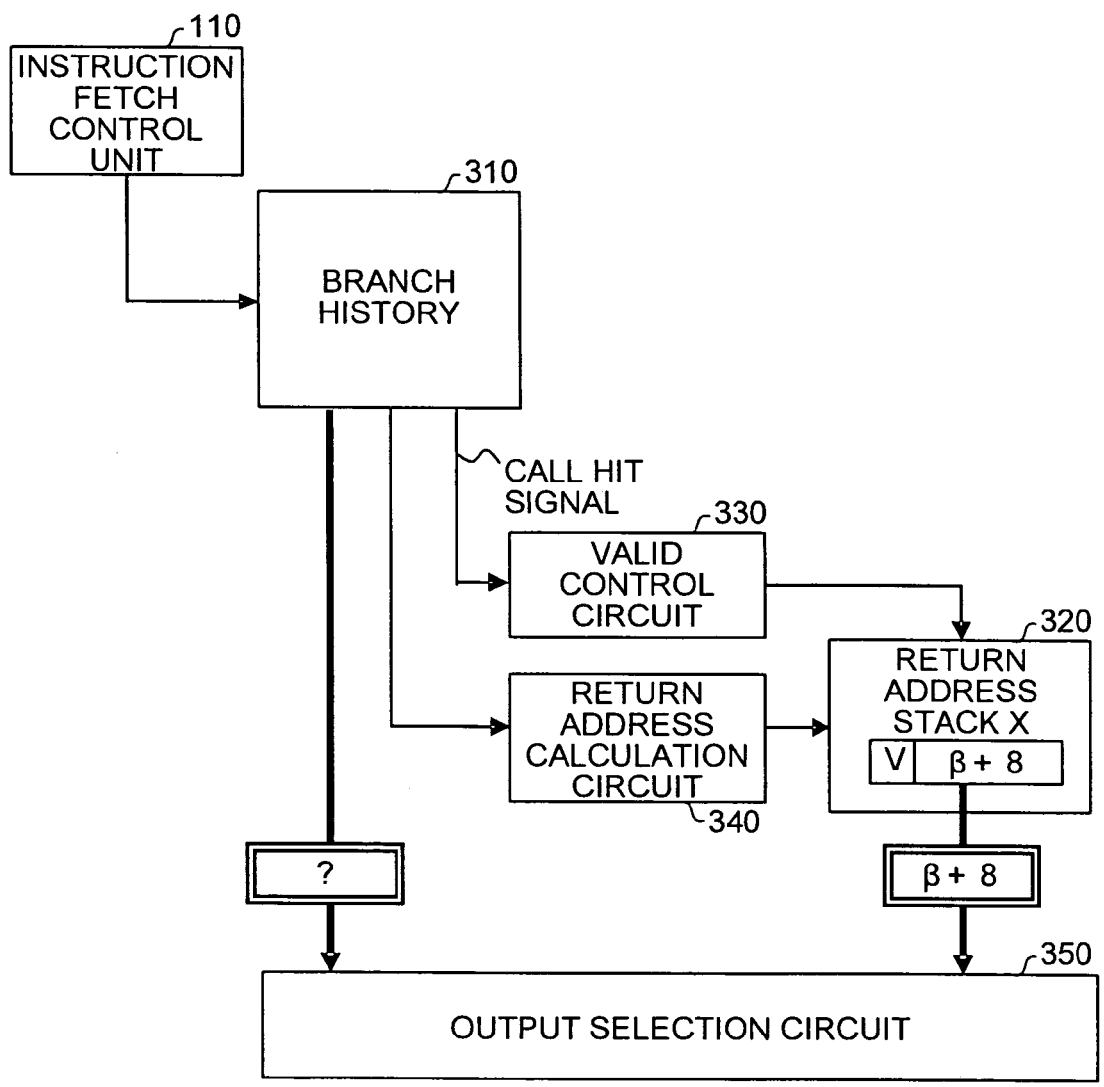
FIG. 18 is an explanatory view for the operations performed by the branch predicting apparatus shown in FIG. 14 when the call instruction is fetched at a step S103.

It is then assumed that the branch history 310 detects the call instruction at the address β. FIG. 18 is an explanatory view for the operations performed by the branch predicting apparatus 300 shown in FIG. 14 when the call instruction is fetched at the step S103.

In this case, by the same operations as those in the case of FIG. 15, the address β+8 is stored in the return address stack X320 as the return address in response to the return instruction, and the value is used when the branch history 310 detects the presence of the return instruction.

Figure 19:
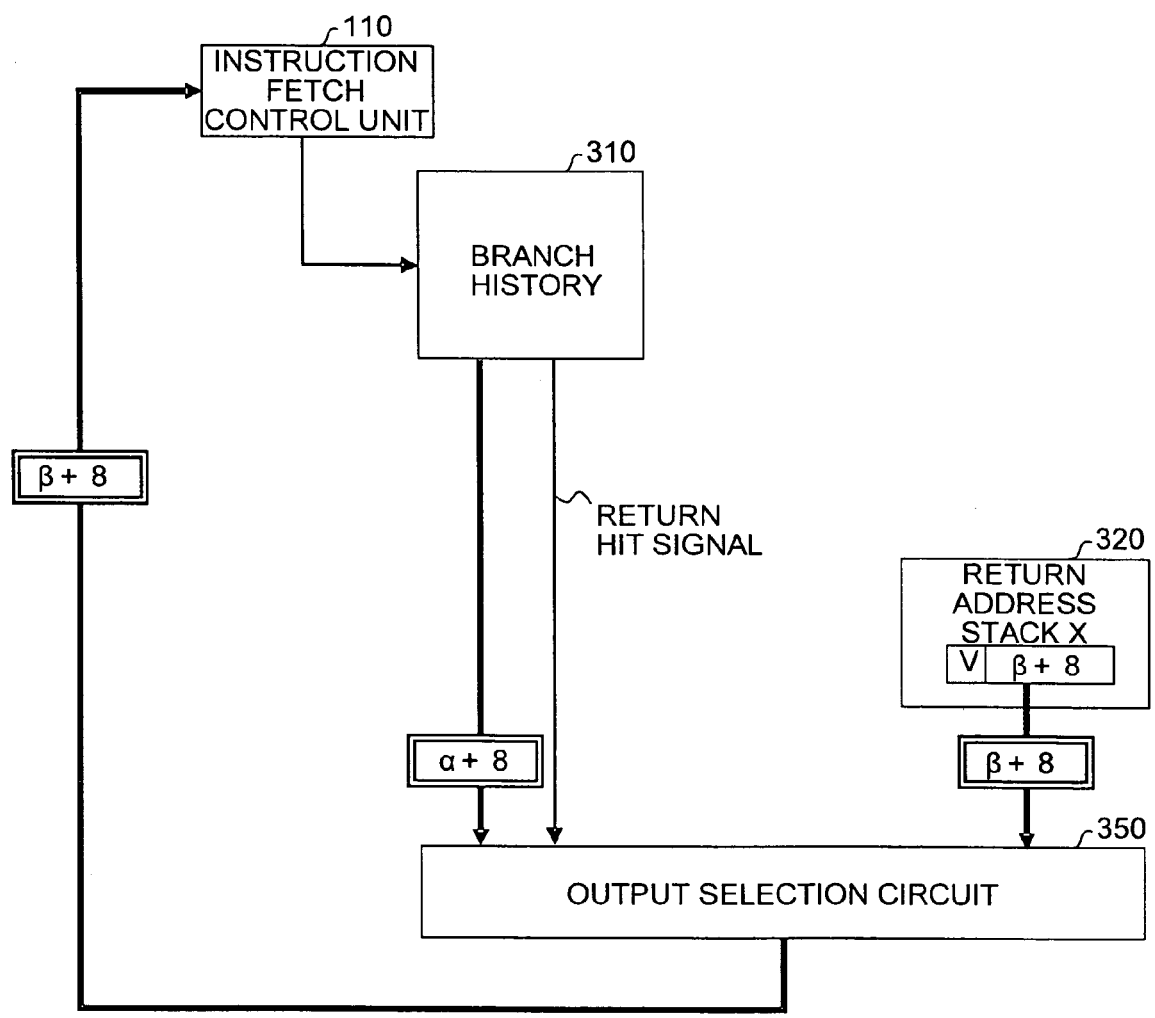
FIG. 19 is an explanatory view for the operations performed by the branch predicting apparatus shown in FIG. 14 when the return instruction is fetched at a step S104.

It is then assumed that the branch history 310 detects the return instruction at the address δ. FIG. 19 is an explanatory view for the operations performed by the branch predicting apparatus 300 shown in FIG. 14 when the return instruction is fetched at the step S104.

In this case, the branch history 310 predicts that the address α+8 that is the return address from the previous address δ is the return target in response to the return instruction. However, since the return hit signal is turned on and the valid bit in the entry of the return address stack X320 is also turned on, the output selection circuit 350 selects the address β+8 stored in the entry of the return address stack X320 as the branch target, and transmits the selected address to the instruction fetch control unit 110.

The address of the correct branch target in this case is β+8, so that the branch predicting apparatus 300 can predict the correct branch target by including therein the return address stack X320.

As explained above, according to the second embodiment, the return address stack X is employed independently so as to predict the return target in response to the return instruction. Even if only the return address stack X is used independently, it is possible to improve the accuracy for predicting the return target in response to the return instruction.

In the present embodiment, the return target in response to the return instruction is predicted based on the prediction made by the branch history 310 that the call instruction is present. As compared with the first embodiment, therefore, the prediction accuracy is low, but a mechanism can be advantageously made simple.

The present invention is constituted such that, when the branch predicting unit predicts presence of the call instruction, the return target of the return instruction is predicted using the first return-address storage unit before the call instruction is executed, and using the second return-address storage unit after the call instruction is executed. It is, therefore, advantageously possible to predict the return target of the return instruction with high accuracy.

Furthermore, the present invention is constituted such that, when the branch predicting unit predicts presence of the call instruction, the return target of the return instruction corresponding to the call instruction is stored, and when the branch predicting unit predicts presence of the return instruction, the stored address is predicted as the return target of the return instruction. It is, therefore, advantageously possible to predict the return target of the return instruction with high accuracy.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A branch predicting apparatus that makes a branch prediction in a pipeline processor, the branch predicting apparatus comprising:
   a branch predicting unit that stores execution history information on a branch instruction that includes a return address in response to a return instruction that corresponds to a call instruction, and that performs the branch prediction based on the execution history information;
   a first return-address storage unit that stores, when the branch predicting unit predicts presence of the call instruction in a sub-routine, a return address in response to the return instruction that corresponds to the call instruction in a first-in last-out manner;
   a second return-address storage unit that stores, when the call instruction in the sub-routine is executed, a return address in response to the return instruction that corresponds to the call instruction in the sub-routine in the first-in last-out manner;
   a return stack pointer that points to an entry that stores a return address to be output;
   an output selecting unit that selects an appropriate return address from return addresses stored in the branch predicting unit, the return address stored in the first return-address storage unit, and the return address stored in the second return-address storage unit, and that outputs the return address selected;
   a valid-entry designating unit that designates either of an entry of the first return-address storage unit and an entry of the second return-address storage unit as a valid entry at a point in time, wherein
   the output selecting units outputs, when the branch predicting unit predicts presence of the return instruction, the return address stored in the entry of the first return-address storage unit or the second return-address storage unit, designated by the valid-entry designating unit and then the valid-entry designation unit turns OFF the valid entry designation of the first return-address storage unit or of the second return-address storage unit that stored the return address last output by the output selecting unit; and
   the output selecting unit outputs, when the entry of the first return-address storage unit or the entry of the second return-address storage unit is pointed by the return stack pointer and neither the entry of the first return-address storage unit nor the entry of the second return-address storage unit is designated as a valid entry by the valid-entry designating unit, the return address stored in the branch predicting unit.

2. The branch predicting apparatus according to claim 1, wherein the valid-entry designating unit designates, when the branch predicting unit predicts the presence of the call instruction, the entry of the first return-address storage unit as the valid entry.

3. The branch predicting apparatus according to claim 1, wherein the valid-entry designating unit designates, when execution of the call instruction is completed or the branch predicting unit predicts the presence of the return instruction, the entry of the second return-address storage unit as the valid entry.

4. A branch predicting apparatus that makes a branch prediction in a pipeline processor, the branch predicting apparatus comprising:
   a branch predicting unit that stores execution history information on a branch instruction that includes a return address in response to a return instruction that corresponds to a call instruction, and that performs the branch prediction based on the execution history information;
   a first return-address storage unit that stores, when the branch predicting unit predicts presence of the call instruction in a sub-routine, a return address in response to the return instruction that corresponds to the call instruction in a first-in last-out manner;
   a second return-address storage unit that stores, when the call instruction in the sub-routine is executed, a return address in response to the return instruction that corresponds to the call instruction in the sub-routine in the first-in last-out manner;
   a return stack pointer that points to an entry that stores a return address to be output;
   an output selecting unit that selects an appropriate return address from return addresses stored in the branch predicting unit, the return address stored in the first return-address storage unit, and the return address stored in the second return-address storage unit, and that outputs the return address selected; and
   a validity control unit that controls a valid-bit between an ON or OFF state included in the entry of the first return-address storage unit so that the output selecting unit can determine whether the return address stored in the entry of the first return-address storage unit is valid and the validity control unit turns the valid-bit to the OFF state, when the execution of the call instruction is completed or the branch predicting unit predicts the presence of the return instruction, of the entry of the first return-address storage unit;

wherein the output selecting unit outputs the return address stored in the branch predicting unit, when the entry of the first return-address storage unit or the entry of the second return-address storage unit is pointed by the return stack pointer, the valid-bit included in the entry of the first return-address storage unit is turned to the OFF state by the validity control unit, and a valid-bit included in the entry of the second return-address storage unit is OFF state.

5. The branch predicting apparatus according to claim 4, wherein the validity control unit turns the valid-bit to the ON state, when the branch predicting unit predicts the presence of the call instruction, of the entry of the first return-address storage unit.

6. A branch predicting method for making a branch prediction in a pipeline processor, the branch predicting method comprising:

a branch predicting step of storing execution history information on a branch instruction that includes a return address in response to a return instruction that corresponds to a call instruction, and performing the branch prediction based on the execution history information;

a first return-address storing step of storing, when presence of the call instruction in a sub-routine is predicted at the branch predicting step, a return address in response to the return instruction that corresponds to the call instruction in a first-in last-out manner;

a second return-address storing step of storing, when the call instruction in the sub-routine is executed, a return address in response to the return instruction that corresponds to the call instruction in the sub-routine in the first-in last-out manner;

a return stack pointing step of pointing to an entry that stores a return address to be output;

an output selecting step of selecting an appropriate return address from return addresses stored at the branch predicting step, the return address stored at the first return-address storing step, and the return address stored in the second return-address storing step, and that of outputting the return address selected;

a valid-entry designating step of designating either of an entry at the first return-address storing step and an entry at the second return-address storing step as a valid entry at a point in time, wherein the output selecting step includes selecting, when presence of the return instruction is predicted at the branch predicting step, the return address stored in the entry designated at the valid-entry designating step; and a validity controlling step of controlling a valid-bit between an ON or OFF state included in the entry at the first return-address storing step so that it is determined whether the return address stored in the entry of the first return-address storage unit is valid at the output selecting step;

wherein the validity controlling step includes turning the valid-bit to the OFF state, when the execution of the call instruction is completed or the presence of the return instruction is predicted at the branch predicting step, of the entry at the first return-address storing step;

wherein the output selecting step includes selecting the return address stored at the branch predicting step, when the entry at the first return-address storing step or the entry at the second return-address storing step is pointed at the return stack pointing step and the valid-bit included in the entry at the first return-address storing step is turned to the OFF state at the validity controlling step, and a valid-bit included in the entry at the second return-address storing step is OFF state.

7. The branch predicting method according to claim 6, wherein the valid-entry designating step includes designating, when the presence of the call instruction is predicted at the branch predicting step, the entry at the first return-address storing step as the valid entry.

8. The branch predicting method according to claim 6, wherein the valid-entry designating step includes designating, when execution of the call instruction is completed or the presence of the return instruction is predicted at the branch predicting step, the entry at the second return-address storing step as the valid entry.

9. The branch predicting method according to claim 6, wherein the validity controlling step includes validating, when the presence of the call instruction is predicted at the branch predicting step, of the entry at the first return-address storing step.

* * * * *